US008484320B2

(12) United States Patent
Sakano

(10) Patent No.: US 8,484,320 B2
(45) Date of Patent: Jul. 9, 2013

(54) INFORMATION PROVIDING SERVER AND WIRELESS COMMUNICATION TERMINAL

(75) Inventor: Shinji Sakano, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 12/862,381

(22) Filed: Aug. 24, 2010

(65) Prior Publication Data

US 2011/0047288 A1 Feb. 24, 2011

(30) Foreign Application Priority Data

Aug. 24, 2009 (JP) ................ 2009-193351

(51) Int. Cl.
*G06F 15/177* (2006.01)
*G06F 15/16* (2006.01)
(52) U.S. Cl.
USPC .......................... 709/220; 709/236
(58) Field of Classification Search
USPC .............. 709/220, 236; 370/338; 455/456.1
See application file for complete search history.

(56) References Cited

U.S. PATENT DOCUMENTS

| 7,006,484 B2 | 2/2006 | Hayama et al. |
| 7,233,581 B2 | 6/2007 | Suzuki et al. |
| 2003/0005112 A1* | 1/2003 | Krautkremer ................ 709/224 |
| 2003/0220114 A1* | 11/2003 | Langensteiner et al. ...... 455/450 |
| 2007/0100981 A1* | 5/2007 | Adamczyk et al. ........... 709/223 |
| 2007/0147324 A1* | 6/2007 | McGary ........................ 370/338 |
| 2009/0216840 A1* | 8/2009 | Pajunen et al. ............... 709/206 |

FOREIGN PATENT DOCUMENTS

| JP | 06-187163 | 7/1994 |
| JP | 11-004474 | 1/1999 |
| JP | 2003-163629 | 6/2003 |
| JP | 2006-179990 | 7/2006 |
| JP | 2008-124619 | 5/2008 |

* cited by examiner

*Primary Examiner* — Asghar Bilgrami
(74) *Attorney, Agent, or Firm* — Antonelli, Terry, Stout & Kraus, LLP.

(57) ABSTRACT

A service providing server transmits service information to a wireless communication terminal via a wireless base station. The service information includes AP identification information of AP software necessary to execute each of a plurality of wireless services, and a utilization priority level of the AP software. The wireless communication terminal receives the service information and displays the name of AP that has the highest priority level in the service information (S55). If an application menu is selected in this state (S56), the name of the AP that has the next highest priority level is displayed (S55). If executing AP software is selected (S56) while the name of the AP is being displayed, this AP software is started up (S53).

8 Claims, 21 Drawing Sheets

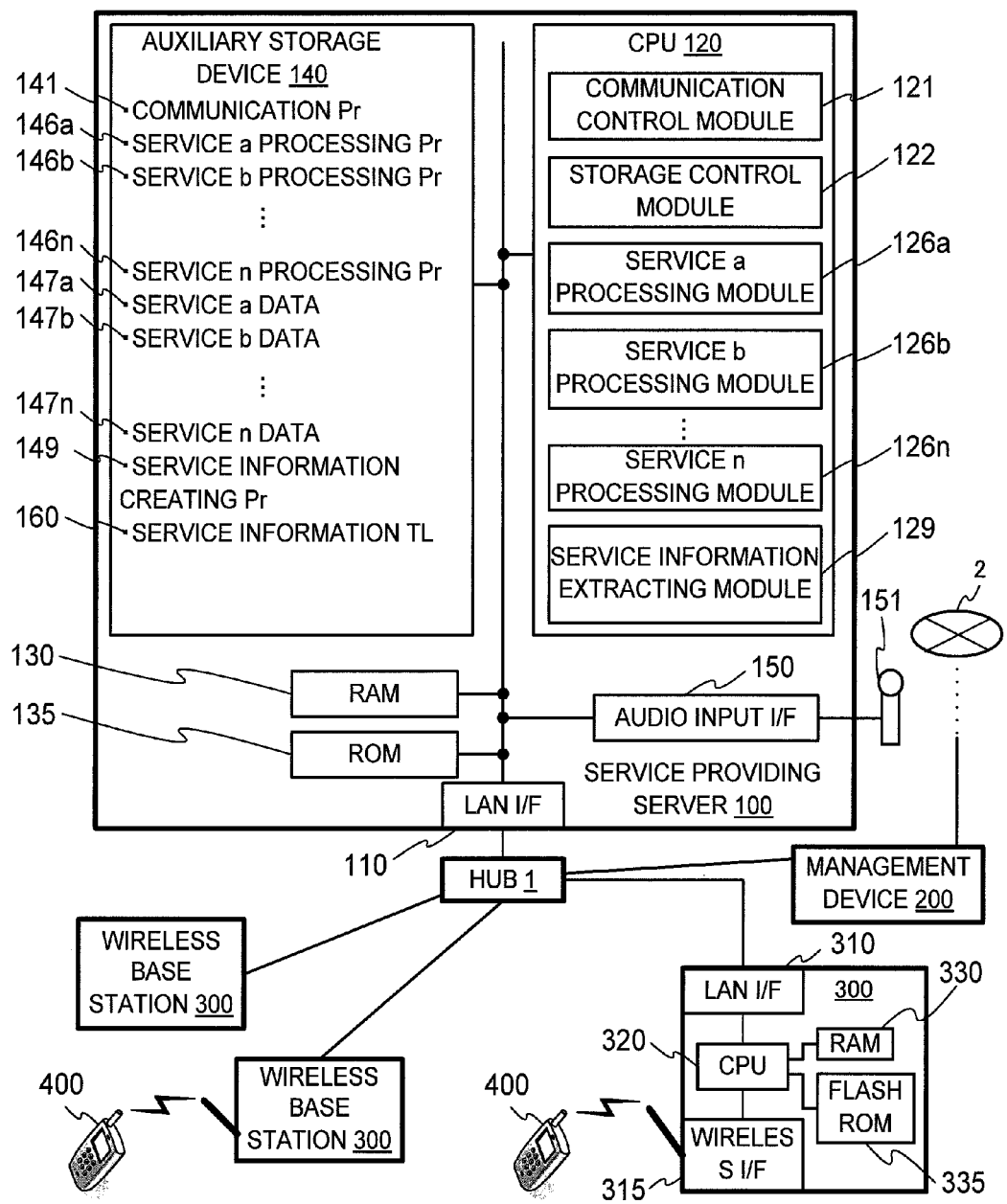

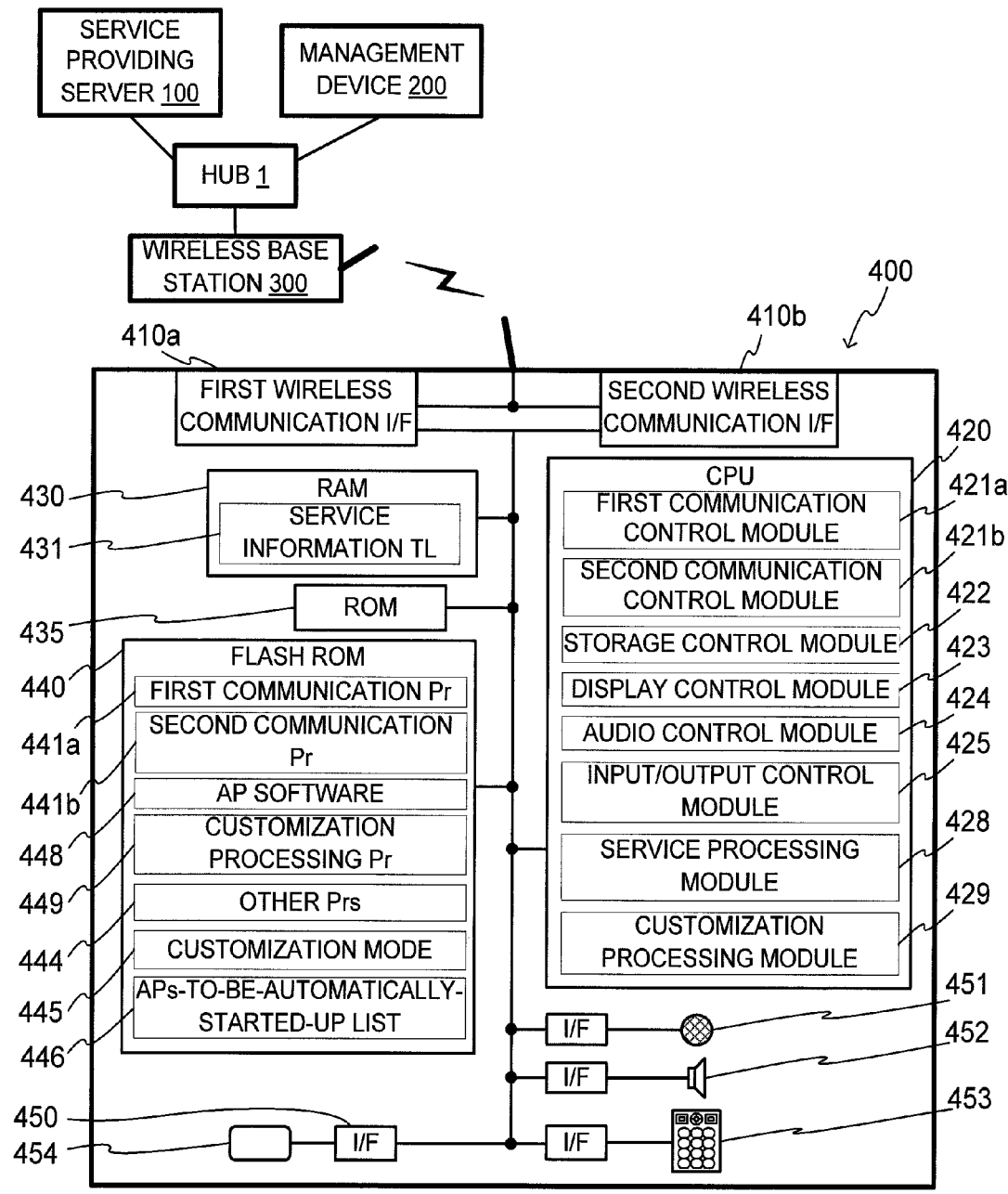

FIG. 4

SERVICE INFORMATION TL 160

| | | | | | | |
|---|---|---|---|---|---|---|
| 161 — | SPACE NAME | TOKAIDO LINE/TRAIN SERVICE NO. A14 | | | | TRAIN CAR NOS. 01, 15 |
| 161a — | SPACE IDENTIFIER | A14 | | | | A14/01 & 15 |
| 162 — | SERVICE NAME | MANNER MODE | TRAIN SERVICE INFORMATION | GET-OFF STATION ALERT | ON-BOARD ENTERTAINMENT | TRAIN OPERATION ASSISTANCE |
| 163 — | AP NAME | MANNER MODE | TRAIN SERVICE INFORMATION | GET-OFF STATION ALERT | ON-BOARD ENTERTAINMENT | TRAIN OPERATION ASSISTANCE |
| 163a — | AP IDENTIFIER | MAR | OGA | OFF | ENT | DRV |
| 164 — | PRIORITY | A | A | A | B | A |
| 165 — | IP ADDRESS | — | ~.263 | ~.263 | ~.263 | ~.263 |
| 166 — | DISTRIBUTION CYCLE | 1.0 | 1.0 | 1.0 | 1.0 | 2.0 |
| 167 — | PASSWORD | — | — | — | — | A14M01 |
| 168 — | BASE STATION MAC ADDRESS (LOWERMOST LAYER) :11 | | | | | ○ |
| | :12 | | | | | — |
| | : | ○ | ○ | ○ | ○ | : |
| | :1E | | | | | — |
| | :1F | | | | | ○ |

FIG. 5

SERVICE INFORMATION TL 431

| PRIORITY | SPACE NAME : SPACE IDENTIFIER | AP NAME : AP IDENTIFIER | IP ADDRESS | RESTRICTION | PASSWORD | DISPLAY |
|---|---|---|---|---|---|---|
| A | TOKAIDO LINE/TRAIN SERVICE NO. A14 : A14 | MANNER MODE: MAR | ~.263 | 0 | — | 0 |
| A | TOKAIDO LINE/TRAIN SERVICE NO. A14 : A14 | TRAIN SERVICE INFORMATION : OGA | ~.263 | 0 | — | 0 |
| A | TOKAIDO LINE/TRAIN SERVICE NO. A14 : A14 | GET-OFF STATION ALERT : OFF | ~.263 | 0 | — | 0 |
| A | TOKAIDO LINE/TRAIN SERVICE NO. A14/ TRAIN CAR NOS. 01, 15 : A14 | TRAIN OPERATION ASSISTANCE : DRV | ~.263 | 1 | A14M01 | 0 |
| B | TOKAIDO LINE/TRAIN SERVICE NO. A14 : A14 | ON-BOARD ENTERTAINMENT : ENT | ~.263 | 0 | — | 0 |

431a  431b  431c  431d  431e  431f  431g

CUSTOMIZATION MODE STORING AREA 445

| 0 |

0: PRIORITY-BASED DISPLAY   1: AUTOMATIC START-UP

APs-TO-BE-AUTOMATICALLY-STARTED-UP LIST 446

|   | SPACE NAME : SPACE IDENTIFIER | AP NAME : AP IDENTIFIER |
|---|---|---|
| 1 | TOKAIDO LINE/TRAIN SERVICE NO. A14 : A14 | MANNER MODE: MAR |
| 2 | TOKAIDO LINE/TRAIN SERVICE NO. A14 : A14 | GET-OFF STATION ALERT : OFF |
| ⋮ | ⋮ | ⋮ |

446a  446b

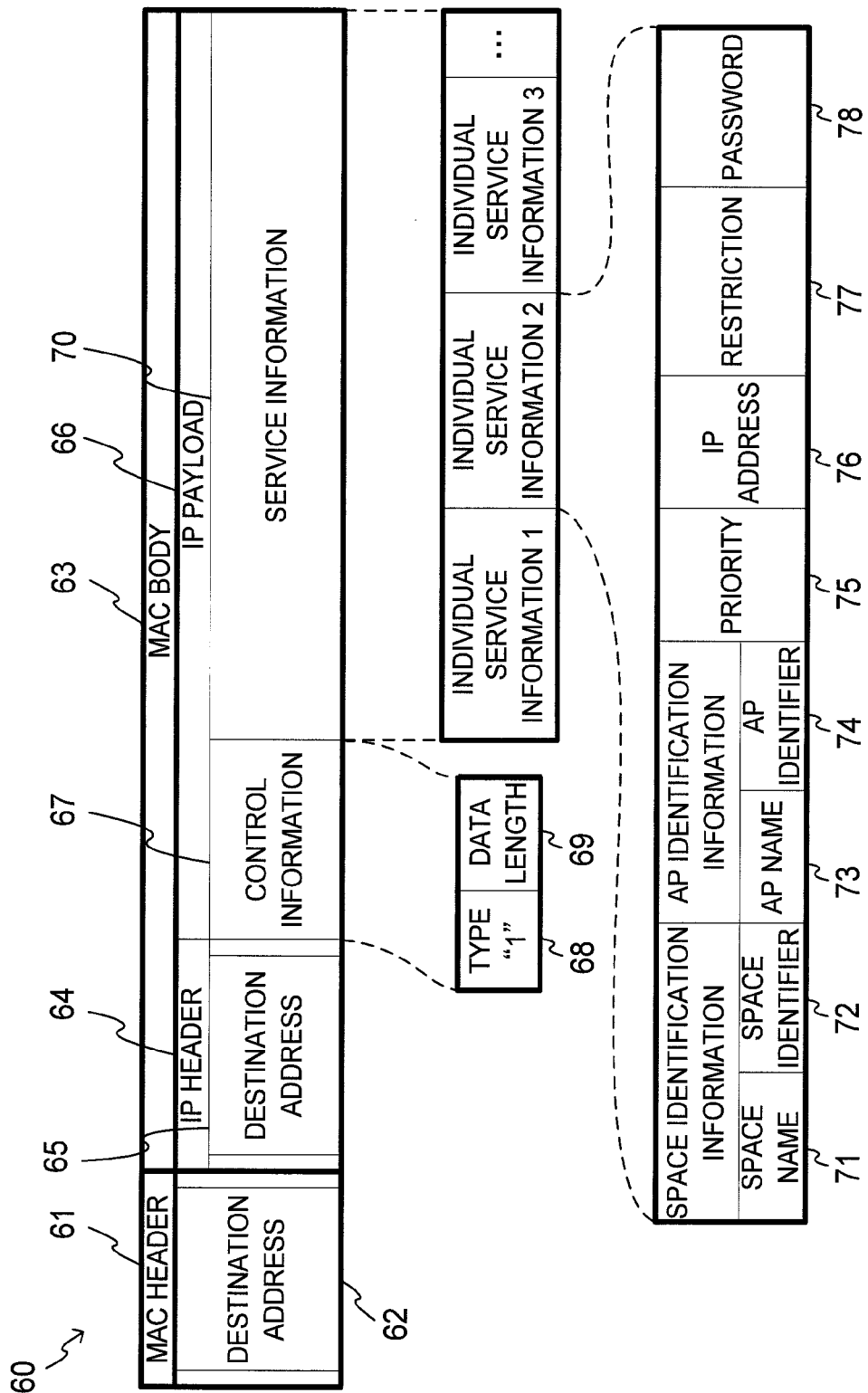

SERVICE INFORMATION DISTRIBUTION PROCESSING

INITIAL SETTING PROCESSING OF CUSTOMIZATION PROCESSING

INFORMATION PROVIDING SERVER AND WIRELESS COMMUNICATION TERMINAL

INCORPORATION BY REFERENCE

This application claims priority based on a Japanese patent application, No. 2009-193351 filed on Aug. 24, 2009, the entire contents of which are incorporated herein by reference.

BACKGROUND OF THE INVENTION

The present invention relates to a technology for enhancing the user-friendliness of wireless services.

Smartphones and mobile personal computers (PCs) which are a type of wireless communication terminal can be carried around to anywhere and, because of this convenience, are used indoor and outdoor alike. There are already thousands or ten thousands of pieces of application software for this type of wireless communication terminal, owing to publicly available System Development Kits (SDKs) which facilitate developing wireless communication terminal application software.

With this abundance of wireless communication terminal application software, it will save users the trouble of selecting application software if one piece of application software suitable for a specific location to which a user carries a wireless communication terminal is automatically chosen from among many pieces of application software loaded on the wireless communication terminal.

This can be realized by, for example, technologies described in Japanese Patent Laid-open Publication No. 2003-163629 (hereinafter, referred to as Patent Document 1) and Japanese Patent Laid-open Publication No. H06-187163 (hereinafter, referred to as Patent Document 2).

In the technology of Patent Document 1, a table showing the relation between the ID of a wireless base station and a piece of application software is set in advance in a wireless communication terminal. The wireless communication terminal refers to the table upon receiving the ID of a wireless base station from the wireless base station, and application software that is associated with the received ID is automatically started up.

In the technology of Patent Document 2, a transmitter that outputs a location ID by radio is set up in each location, and a table showing the relation between a location ID and a piece of application software is set in advance in a wireless communication terminal. The wireless communication terminal refers to the table upon receiving a location ID from one of the transmitters, and application software that is associated with the received ID is automatically started up. Patent Document 2 also discloses a method in which a table showing the relation between a location ID and a plurality of prioritized pieces of software is set in advance in a wireless communication terminal, the wireless communication terminal refers to the table upon receiving a location ID from one of the transmitters, and a plurality of pieces of application software that are associated with the received ID are automatically started up in the order of priority.

SUMMARY OF THE INVENTION

However, the technologies described in Patent Documents 1 and 2 both have a problem in that users bear a burden of the need to set a table showing the relation between an ID for identifying a location or the like and software to be automatically started up in association with the identified location or the like in a wireless communication terminal in advance. In particular, associating one out of numerous pieces of application software with each of a plurality of locations as in the above-mentioned case is a heavy burden to users.

The present invention has been made in view of the problem of the related art, and an object of the present invention is therefore to enhance the user-friendliness of wireless services by minimizing burdens imposed on users and facilitating the selection of application software that is suitable for a specific location.

In order to solve the above-mentioned problem, an information providing server according to the present invention includes:

storage means which stores, for each of at least one wireless base station, service information in association with an identifier of the each of the at least one wireless base station, the service information including application identification information of at least one piece of application software that is available within a wireless service area of the each of the at least one wireless base station, and/or a utilization priority level of each of the at least one piece of application software, and/or space identification information of at least one piece of a service area;

service information extracting means which extracts from the storage means the service information that is associated with an identifier of any one of the at least one wireless base station;

communication control means which creates a communication frame that contains the service information extracted by the service information extracting means; and communication means which transmits the communication frame created by the communication control means to the each of the at least one wireless base station that is associated with the service information in the communication frame, to thereby transmit by radio the service information in the communication frame from the each of the at least one wireless base station.

Regarding the phrase "application identification information of at least one piece of application software that is available within a wireless service area of the each of the at least one wireless base station, and/or a utilization priority level of each of the at least one piece of application software, and/or space identification information of at least one piece of a service area", such phrase may be interpreted as being any combination of: at least one piece of application software; the utilization priority level; and the space identification information. That is, only one of such three items may be included, or any two of the three items, or all three.

In the case where the wireless base station communicates by radio for at least one wireless service, at least one of the at least one piece of the application software that can be used within the wireless service area of the wireless base station is preferably application software that is necessary to execute one of the at least one wireless service.

In order to solve the above-mentioned problem, a wireless communication terminal according to the present invention includes:

wireless communication means which communicates by radio with a wireless base station;

control means; and/or display means, in which the control means is configured to:

perform analysis on a wireless signal received from the wireless base station by the wireless communication means, and determine whether or not information carried on the wireless signal contains service information, which includes application identification information of at least one piece of application software that is available within a wireless service area of the wireless base station and/or a utilization priority level of each of the at least one piece of application software and/or space identification information of at least one piece of a service area; and when it is determined as a result of the analysis that the information carried on the wireless signal contains the service information, execute customization processing, e.g. display customization processing in which the display means of the wireless communication terminal displays at least one piece of the application identification information contained in the service information in order of utilization priority, based on a utilization priority level that is assigned to each of the at least one piece of the application identification information.

Regarding the phrase "application identification information of at least one piece of application software that is available within a wireless service area of the wireless base station and/or a utilization priority level of each of the at least one piece of application software and/or space identification information of at least one piece of a service area", such phrase may be interpreted as being any combination of: at least one piece of application software; the utilization priority level; and the space identification information. That is, only one of such three items may be included, or any two of the three items, or all three.

In the present invention, each wireless base station providing a wireless service provides service information as well. The identification information of every service that allows users to receive a wireless service at the current location is therefore given without advance knowledge of the service set identifier (SSID) of a wireless base station at the current location and of what wireless service is provided at the current location, and without the need to set in advance a table showing the relation between an ID for identifying a location or the like and application software to be automatically started up in connection with the identified location or the like. The present invention can thus enhance the user-friendliness of wireless services without burdening users.

BRIEF DESCRIPTION OF THE DRAWINGS

In the accompanying drawings:

FIG. 2 is a configuration diagram of a service providing server and a wireless base station according to the first embodiment of the present invention;

FIG. 3 is a configuration diagram of a wireless communication terminal according to the first embodiment of the present invention;

FIG. 4 is an explanatory diagram illustrating the data configuration of a service information table in the service providing server according to the first embodiment of the present invention;

FIG. 5 is an explanatory diagram illustrating the data configurations of a service information table, a customization mode storing area, and an applications-to-be-automatically-started-up list in the wireless communication terminal according to the first embodiment of the present invention;

FIG. 6 is an explanatory diagram illustrating the data structure of a communication frame of service information according to the first embodiment of the present invention;

DESCRIPTION OF THE PREFERRED EMBODIMENTS

Service providing systems and wireless communication terminals according to embodiments of the present invention are described below with reference to the drawings.

First Embodiment

Figure 1:
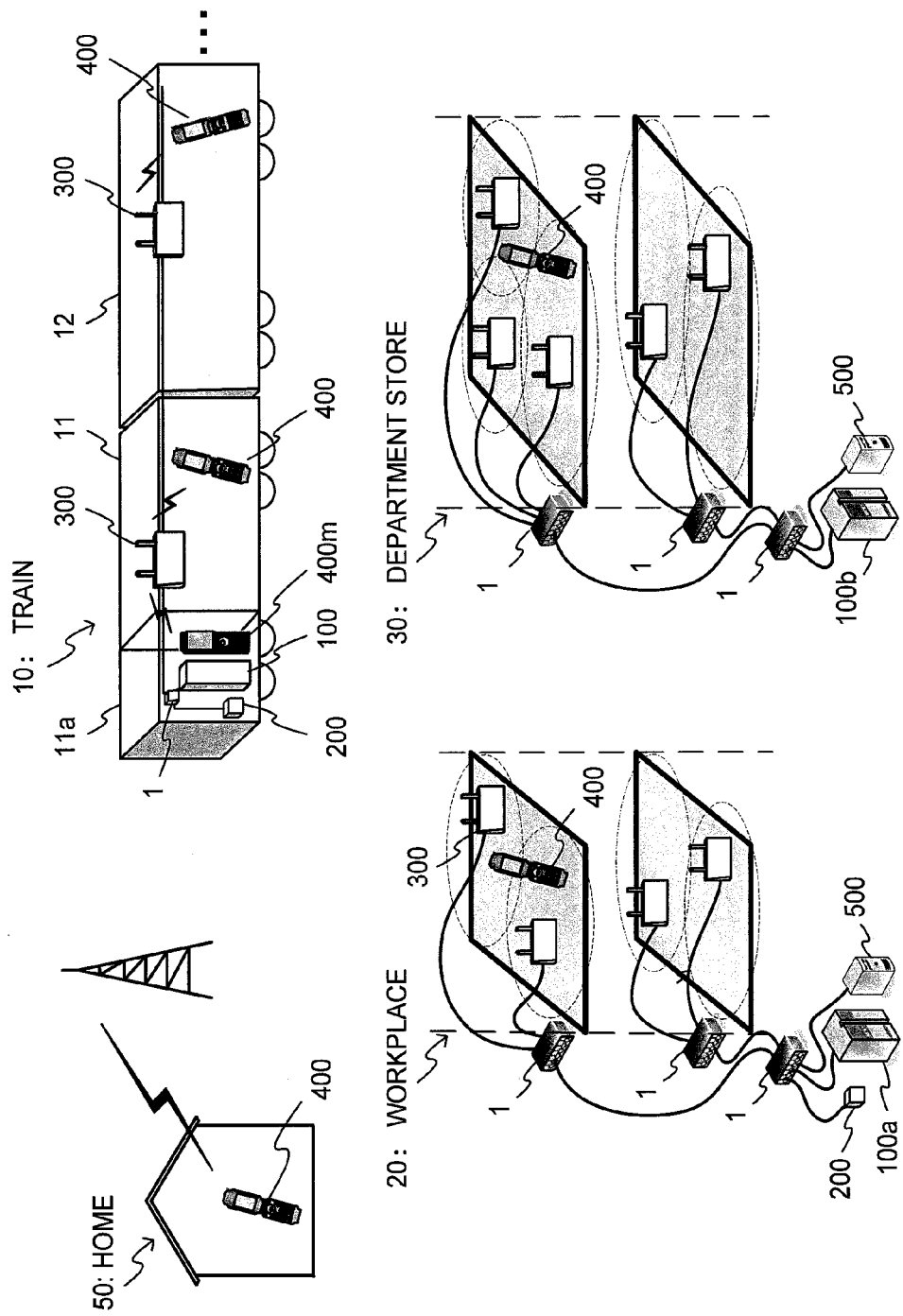
FIG. 1 is a system diagram of a service providing system according to a first embodiment of the present invention.

In this embodiment, service providing systems are set up at a plurality of locations as illustrated in FIG. 1. The service providing system at each location provides a wireless service, which is received by a wireless communication terminal 400.

The wireless communication terminal 400 is, for example, a cellular phone capable of wireless communication over a cellular phone network and, in addition, wireless communication in a specific area that is provided by a wireless LAN or the like. Each service providing system uses wireless communication within a specific area, for example, a wireless LAN system defined in IEEE 802.11, to provide a wireless service to the wireless communication terminal 400. Wireless services here employ the wireless LAN system, but the present invention is not limited thereto.

In this embodiment, service providing systems are set up on a train 10, and in a workplace 20, a department store 30, and other places. No service providing system is set up at a home 50 of the owner of the wireless communication terminal 400 or in the neighborhood thereof. At the home 50, the owner of the wireless communication terminal 400 therefore cannot receive a wireless service through wireless communication within a specific area that is provided by a wireless LAN or the like.

The service providing system that is set up on the train 10 includes a service providing server 100, which provides a wireless service and information about the wireless service, a management device 200, which is for changing and managing data of the service providing server 100, and a wireless base station 300, which is provided in each of train cars 11, 12, . . . of the train 10.

The service providing system that is set up in the workplace 20 includes a service providing server 100a, which provides a wireless service, an information providing server 500, which provides information about the wireless service, the management device 200, which manages data handled by the servers 100a and 500 and other data, and the wireless base station 300, which is installed on each floor in the workplace 20.

The service providing system that is set up in the department store 30 includes a service providing server 100b, which provides a wireless service, the information providing server 500, which provides information about the wireless service, and the wireless base station 300, which is installed on each section of the each floor in the department store 30.

The service providing server 100 set up on the train 10 has the functions of both the service providing server 100a and the information providing server 500 that are set up in the workplace 20. The service providing server 100b setup in the department store 30 has the functions of both the service providing server 100a and the management device 200 that are set up in the workplace 20.

Thus, while the service providing systems set up in different places are given different configurations due to an integration or separation of functions, the overall function of each service providing system is essentially the same.

The service providing system set up on the train 10 is therefore picked up as a representative of all those service providing systems, and described in detail below.

The service providing server 100 and management device 200 of this service providing system are placed in an operator's compartment 11a of the first train car 11. A train operator in the operator's compartment 11a carries around a wireless communication terminal 400m. A conductor in an operator's compartment of the last train car (not shown) in FIG. 1 is also carrying the wireless communication terminal 400m. Passengers in the train cars 11, 12, . . . each have the wireless communication terminal 400.

The service providing server 100, the wireless base station 300, which is provided in each of the train cars 11, 12, . . . , and the management device 200 are connected by a hub 1 as illustrated in FIG. 2, in a manner that allows them to communicate with one another. The management device 200 is connected to an external network 2 via a wireless device or the like to obtain various types of data from the outside.

The service providing server 100 includes a LAN interface 110, which is connected to the hub 1, a CPU 120, which executes various types of computing, a RAM 130, which serves as a work area of the CPU 120 among others, a ROM 135, which stores various types of data in advance, an auxiliary storage device 140, which is a hard disk drive device or the like, a microphone 151, and an audio input interface 150, which performs processing on an analog audio signal from the microphone 151, including conversion into a digital audio signal.

The auxiliary storage device 140 stores programs, data, and the like in advance. The stored programs and data include a communication program 141, which enables the CPU 120 to execute communication control processing, service processing programs 146a, 146b, . . . , 146n, which enable the CPU 120 to execute various types of service processing, service data 147a, 147b, . . . , 147n of the respective services, a service information creating program 149, which enables the CPU 120 to create service information about a service, and a service information table 160, which stores individual service information for each service. In addition, the auxiliary storage device 140 stores various other programs, configuration information of the service providing server 100, configuration information of various devices connected to an intra-train LAN, and others.

Those programs, data, and the like are, in this embodiment, all provided by the management device 200 but do not need to be provided by the management device 200. For example, in the case where the service providing server 100 includes a communication device that allows communication with the outside, the programs, data, and the like may be provided from the outside via the communication device. To give another example, in the case where the service providing server 100 includes a device that reproduces data in a disk storage medium such as a CD or a DVD, the programs, data, and the like may be provided from the outside via a disk storage medium loaded in the data reproducing device.

The CPU 120 has function modules including a communication control module 121, which controls communication over the intra-train LAN, a storage control module 122, which controls data input and data output in the auxiliary storage device 140, service processing modules 126a, 126b, . . . , 126n, which execute various types of service processing, and a service information extracting module 129, which extracts given service information from the auxiliary storage device 140. The communication control module 121 is implemented by running the communication program 141, which is stored in the auxiliary storage device 140. The storage control module 122 is implemented by running a program (not shown) that is stored in the auxiliary storage device 140. The service processing modules 126a, 126b, . . . , 126n and the service information extracting module 129 are implemented respectively by running the service processing programs 146a, 146b, . . . , 146n and the service information creating program 149, which are stored in the auxiliary storage device 140.

The service providing server 100 thus functions not only as a service providing server which provides various wireless services but also as an information providing server which provides service information about the various wireless services. Note that, while the function of a service providing server and the function of a service environment information providing server are incorporated in the single server 100 in this embodiment, the functions of the two may be implemented by separate servers as in the systems set up in the workplace 20 and the department store 30.

The management device 200 is a computer that can communicate with the service providing server 100 and the wireless base station 300 via the external network 2 or the hub 1.

The wireless base station 300 includes a LAN interface 310, which is connected to the hub 1, a CPU 320, which executes various types of computing, a RAM 330, which serves as a work area of the CPU 320 among others, and a flash ROM 335. The flash ROM 335 stores a communication program that enables the CPU 320 to function as a communication control module, the configuration information of the wireless base station 300, and the like.

The wireless communication terminal 400 includes, as illustrated in FIG. 3, a first wireless communication interface 410a, which is for wireless communication over a cellular phone communication network, a second wireless communication interface 410b, which is for wireless communication over a wireless LAN, a CPU 420, which executes various types of computing, a RAM 430, which serves as a work area of the CPU 420 among others, a ROM 435, which keeps various types of data and the like stored in advance, a flash ROM 440, which stores various programs, various types of data, and the like, a microphone 451, a speaker 452, input keys 453, a display 454, and an interface 450, which is an interface for the microphone 451, the speaker 452, the input keys 453, and the display 454.

The programs and data stored in the flash ROM 440 in advance include a first communication program 441a and a second communication program 441b, which enable the CPU 420 to execute communication control processing, service application software 448, which enables the CPU 420 to process service data provided by the service providing server 100, a customization processing program 449, which enables the CPU 420 to customize what is displayed with the use of service information provided by the service providing server 100, various other programs 444, configuration information of the wireless communication terminal 400, and the like. In addition, the flash ROM 440 contains a customization mode storing area 445, where customization modes described later are stored, and an applications-to-be-automatically-started-up list 446, which holds identification information of application software to be started up automatically when service information is received.

The RAM 430 contains a service information table 431, which stores service information received in the process of executing the customization processing program 449, and a services-to-be-used-list (not shown), which stores identification information of services planned to be used.

The CPU 420 has function modules including a first communication control module 421a, which controls wireless communication over a cellular phone communication network, a second communication control module 421b, which controls wireless communication over a wireless LAN, a storage control module 422, which controls data input and data output in the flash ROM 440, a display control module 423, which controls the displaying operation of the display 454, an input/output control module 425, which controls input made with the input keys 453, a service processing module 428, and a customization processing module 429. The service processing module 428 is implemented when the CPU 420 runs the service application software 448, which is stored in the flash ROM 440. The customization processing module 429 is implemented when the CPU 420 runs the customization processing program 449, which is stored in the flash ROM 440.

The data configuration of the service information table 160, which is stored in the auxiliary storage device 140 of the service providing server 100, is described next with reference to FIG. 4.

The service information table 160 includes a space name area 161, where the name of a service providing space of various services provided by the service providing server 100 is stored, a service space identifier area 161a, where the identifier of the service providing space is stored, a service name area 162, where the service names of the respective services are stored, an application name area 163, where the names of pieces of application software necessary to execute the respective services are stored, an application identifier area 163a, where the identifiers of the pieces of application software are stored, a priority area 164, where the execution priority levels of the respective services on the wireless communication terminals side, i.e., the utilization priority levels of the respective pieces of application software, are stored, an IP address area 165, where the IP address of a provider of the services are stored, a distribution cycle area 166, where the distribution cycle of individual service information is stored for each service, a password area 167, where a password for disabling the security of individual service information is stored, and an association relation area 168, where the association relations of each wireless base station 300 with the respective services are stored.

In this example, in the space name area 161, there are stored "Tokaido Line/Train service No. A14" which specifies the entirety of a train as a service providing space and "Tokaido Line/Train service No. A14/Train car Nos. 01, 15" which specifies the first car at the head of the train and the fifteenth car at the tail end of the train as service providing spaces.

In the name space identifier area 161a, there are stored "A14" which serves as the identifier of the space name "Tokaido Line/Train service No. A14" and "A14/01 & 15" which serves as the identifier of the space name "Tokaido Line/Train service No. A14/Train car Nos. 01, 15".

In the service name area 162, there are stored "manner mode", "Train service information", "get-off station alert", and "on-board entertainment", which serve as the identifiers of service names of the space name "Tokaido Line/Train service No. A14" and "train operation assistance" which serves as the service name of the space name "Tokaido Line/Train service No. A14/Train car Nos. 01, 15".

The service "manner mode" is a service that automatically puts the wireless communication terminal 400 of each user into a manner mode. The service "Train service information" is a service that notifies users of what train the users are on, the route along which the train is run, and a train service status of other routes connecting to the route. The service "get-off station alert" is a service to notify a user, when the train approaches the station at which the user is to get off the train, that the train will arrive the station at anytime soon. The service "on-board entertainment" is a service that provides news, weathercasts, entertainment information, advertisements, and the like to general passengers. The service "train operation assistance" is a service that assists the duties of the train operator and the conductor.

In the application name area 163, an application software name "manner mode" is stored in association with the service name "manner mode", an application software name "Train service information" is stored in association with the service name "Train service information", an application software name "get-off station alert" is stored in association with the service name "get-off station alert", an application software name "on-board entertainment" is stored in association with the service name "on-board entertainment", and an application software name "train operation assistance" is stored in association with the service name "train operation assistance". While each application software name matches its associated service name in this example, the two do not need to match.

In the application identifier area 163a, an application software identification "MAR" is stored in association with the application software name "manner mode", an application software identification "OGA" is stored in association with the application software name "Train service information", an application software identification "OFF" is stored in association with the application software name "get-off station alert", an application software identification "ENT" is stored in association with the application software name "on-board entertainment", and an application software identification "DRV" is stored in association with the application software name "train operation assistance".

In the priority area 164, a priority level "A" is stored in association with the application software names "manner mode", "Train service information", "get-off station alert", and "train operation assistance", and a priority level "B" is stored in association with the application software name "on-board entertainment". Of the priority levels "A, B, . . . " that are stored in the priority area 164, "A" is assigned to the application software with the highest priority level and "B" is assigned to the application software with the second highest.

In the IP address area 165, there is stored "xxx-.yyy.zzz.263", which is the IP address of the service providing server 100, as the IP address of the service provider of the services "Train service information", "get-off station alert", "on-board entertainment", and "train operation assistance". The "manner mode" service is a so-called push service and is provided from the service providing server 100 to the wireless communication terminal 400 in a one-way manner. Because there is no need to notify the wireless communication terminal 400 of the provider of the "manner mode" service, no IP address is stored in a section of the IP address area 165 that is allocated to this service. The services "Train service information", "get-off station alert", and "on-board entertainment" are basically push services, too, but the wireless communication terminal 400 may need to send some request or data to the service provider. An IP address is therefore stored in sections of the IP address area 165 that are allocated to those services. The "train operation assistance" service is a service premised on two-way communication between a service provider and the wireless communication terminal 400m (illustrated in FIG. 1). An IP address is therefore stored in a section of the IP address area 165 that is allocated to the "train operation assistance" service.

In the distribution cycle area 166, "1 (second)" is stored as the distribution cycle of individual service information about the services "manner mode", "Train service information", "get-off station alert", and "on-board entertainment", and "2 (seconds)" is stored as the distribution cycle of individual service information about the service "train operation assistance".

In the password area 167, "A14M01" is stored as a password for disabling the security or the like of individual service information about the service "train operation assistance". The password is input from the management device 200 in the operator's compartment 11a when, for example, the operator starts operating the train. The password area 167 stores one password in one section in this example, but may store a plurality of passwords.

In the association relation area 168, pieces of individual service information about the respective services "manner mode", "Train service information", "get-off station alert", and "on-board entertainment" are associated with the wireless base station 300 in every train car, from the wireless base station 300 that is in the first car at the head of the train and has ":11" as the lowermost layer of its MAC address to the wireless base station 300 that is in the fifteenth car at the tail end of the train and has ":1F" as the lowermost layer of its MAC address. The association relation area 168 also associates individual service information of the service "train operation assistance" with the wireless base station 300 that is in the first car at the head of the train and has ":11" as the lowermost layer of its MAC address and with the wireless base station 300 that is in the fifteenth car at the tail end of the train and has ":1F" as the lowermost layer of its MAC address.

Given below is a description on the operation of the service providing server 100.

Figure 8:
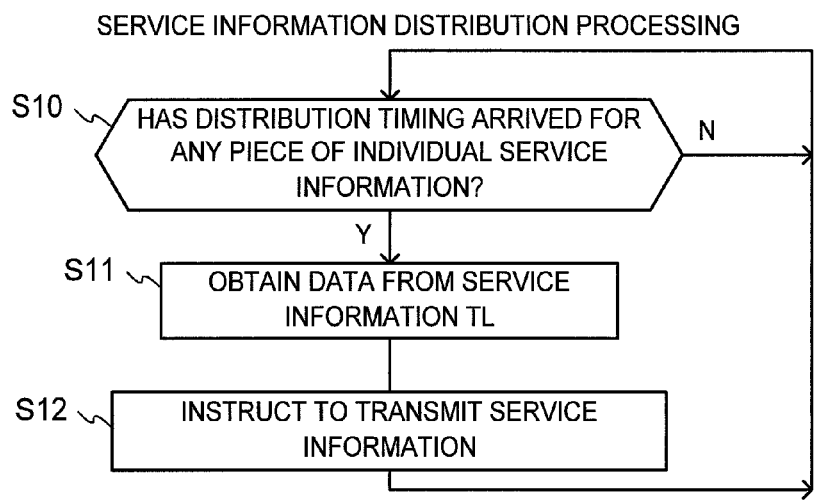
FIG. 8 is a flow chart illustrating service information distribution processing of the service providing server according to the first embodiment of the present invention.

How the service information extracting module 129 of the service providing server 100 operates is described first with reference to FIG. 8.

The service information extracting module 129 refers to the distribution cycle area 166 in the service information table 160 (FIG. 4) to monitor whether or the time has come to distribute individual service information for any service (S10). When the time to distribute individual service information for at least one of the services comes, the service information extracting module 129 obtains from the service information table 160 every piece of individual service information scheduled to be distributed at that time (S11), creates service information that contains every piece of individual service information scheduled to be distributed at that time, causes the communication control module 121 to create a communication frame that contains the service information, and instructs the communication control module 121 to transmit the communication frame (S12). As a result, the communication frame of the service information is broadcast by radio from the wireless base station 300 that is specified in the communication frame via the LAN interface 110. Subsequently, Steps S10 to S12 are repeated.

According to the service information table 160 of FIG. 4, a distribution cycle of pieces of individual service information about the services "manner mode", "Train service information", "get-off station alert" is "1 (second)", and a distribution cycle of "on-board entertainment" and individual service information about the service "train operation assistance" is "2 (seconds)". Pieces of individual service information about the services "manner mode", "Train service information", "get-off station alert", and "on-board entertainment" are distributed to the wireless base station 300 in every train car except the first car at the head of the train and the fifteenth car at the tail end of the train, i.e., each train car from the second car to the fourteenth car. Pieces of individual service information about the services "manner mode", "Train service information", "get-off station alert", "on-board entertainment", and "train operation assistance" are distributed to the wireless base station 300 in the first car at the head of the train and to the wireless base station 300 in the fifteenth car at the tail end of the train.

Accordingly, in this service information distribution processing, the service information extracting module 129 creates service information that contains pieces of individual service information about the services "manner mode", "Train service information", "get-off station alert", and "on-board entertainment" for every second, and causes the communication control module 121 to transmit this service information to the wireless base station 300 in each of the second to fourteenth train car. The service information extracting module 129 does cause the communication control module 121 to transmit the service information to the wireless base stations 300 in the first train car and the last train car for every second, but also creates alternately service information that contains pieces of individual service information about all services except the "train operation assistance" service, namely, the services "manner mode", "Train service information", "get-off station alert", and "on-board entertainment", and service information that contains pieces of individual service information about all services, and causes the communication control module 121 alternately to transmit those two types of service information to the wireless base stations 300 in the first train car and the last train car.

How the service processing modules 126a, 126b, ..., 126n of the service providing server 100 operate is described next. For convenience's sake, the following description assumes that the service a processing module 126a processes the "Train service information" service, which is basically a push service but sometimes involves two-way communication, whereas the service b processing module 126b processes the "train operation assistance" service, which is premised on two-way communication with the wireless communication terminals 400m.

The operation of the service a processing module 126a which processes the "Train service information" service is described first.

The service a data 147a of the "Train service information" service in the auxiliary storage device 140 includes service contents data to be distributed to each wireless communication terminal 400, and a schedule indicating when to distribute this data as well. The service a processing module 126a which processes the "Train service information" service refers to the schedule and, when it is time to distribute the service contents data, obtains the service a data 147a from the auxiliary storage device 140 via the storage control module 122, causes the communication control module 121 to create a communication frame that contains a part of or the entirety of the service a data 147a, and instructs the communication control module 121 to transmit the communication frame. In the case where the wireless communication terminal 400 sends some request or data to the service providing server 100 in response to the transmitted communication frame, the service a processing module 126a receives the request or data from the communication control module 121, responds by processing the request or data, and causes the communication control module 121 to send a result of the processing to the wireless communication terminal 400.

Described next is the operation of the service b processing module 126b which processes the "train operation assistance" service premised on two-way communication with the wireless communication terminals 400m.

The service b processing module 126b monitors an update made by the storage control module 122 to the service b data 147b of the "train operation assistance" service in the auxiliary storage device 140. When the service b data 147b is updated or when one of the wireless communication terminals 400m sends a request of the service b data 147b, the service b processing module 126b obtains the service b data 147b from the auxiliary storage device 140 via the storage control module 122, causes the communication control module 121 to create a communication frame that contains a part of or the entirety of the service b data 147b, and instructs the communication control module 121 to transmit the communication frame. In the case where the wireless communication terminal 400m sends some request or data to the service providing server 100 in response to the transmitted communication frame, the service b processing module 126b receives the request or data from the communication control module 121, responds by processing the request or data, and causes the communication control module 121 to send a result of the processing to the wireless communication terminal 400m.

The configuration of a service information communication frame 60, which is transmitted from the service providing server 100, is described next with reference to FIG. 6.

The service information communication frame 60 includes a MAC header 61 and a MAC body 63. The MAC header 61 stores a destination address 62 and other data, and the MAC body 63 stores an IP packet.

The IP packet includes a header 64, which stores a destination address 65 and other data, and a payload 66, which stores control information 67 and service information 70. As the destination address 62 of the MAC header 61, the MAC address of the wireless base station 300 to which the service information 70 is to be sent is set. Set as the destination address 65 of the IP header 64 is a broadcast address that includes all of the wireless communication terminals 400 as the destinations of the IP packet leaving the wireless base station 300.

The control information 67 includes a type 68 and a data length 69. As the type 68, "1" is stored to indicate that data in the payload 66 is service information. In the case where data in the payload 66 is service data, "2" is stored as the type 68. Stored as the data length 69 is the data length of the service information 70.

The service information 70 is a group of at least one piece of individual service information. Individual service information of each service contains a space name 71, which is a type of space identification information for identifying a space where the service is provided, a space identifier 72, which is another type of the space identification information, an application name 73, which is a type of application software identification information for identifying application software necessary to receive the service, an application identifier 74, which is another type of the application software identification information, a priority 75, which indicates the utilization priority level of the identified application software, an IP address 76 of the provider of the service, a restriction flag area 77, which indicates whether or not this individual service information is available only to limited users, and a password 78.

The service information extracting module 129 creates the above-mentioned service information 70 in Step S10 of FIG. 8 described above and hands over the service information 70 to the communication control module 121.

The service information extracting module 129 accesses the service information table 160 (FIG. 4) to obtain the constituents of individual service information in the service information 70, and extracts the space name 71, the space identifier 72, the application name 73, the application identifier 74, the priority 75, the IP address 76, and the password 78 from the space name area 161, the space identifier area 161a, the application name area 163, the application identifier area 163a, the priority area 164, the IP address area 165, and the password area 167, respectively. In the case of individual service information for which a password is stored in the password area 167 of the service information table 160 (FIG. 4), "1 (meaning "restricted")" is stored in the restriction flag area 77 of the individual service information in the service information 70, and the password in the password area 167 of the table 160 is stored as the password 78. In the case of individual service information for which no password is stored in the password area 167 of the table 160, "0 (meaning "not restricted")" is stored in the restriction flag area 77 of the individual service information in the service information 70, and "-" is stored as the password 78.

Figure 7:
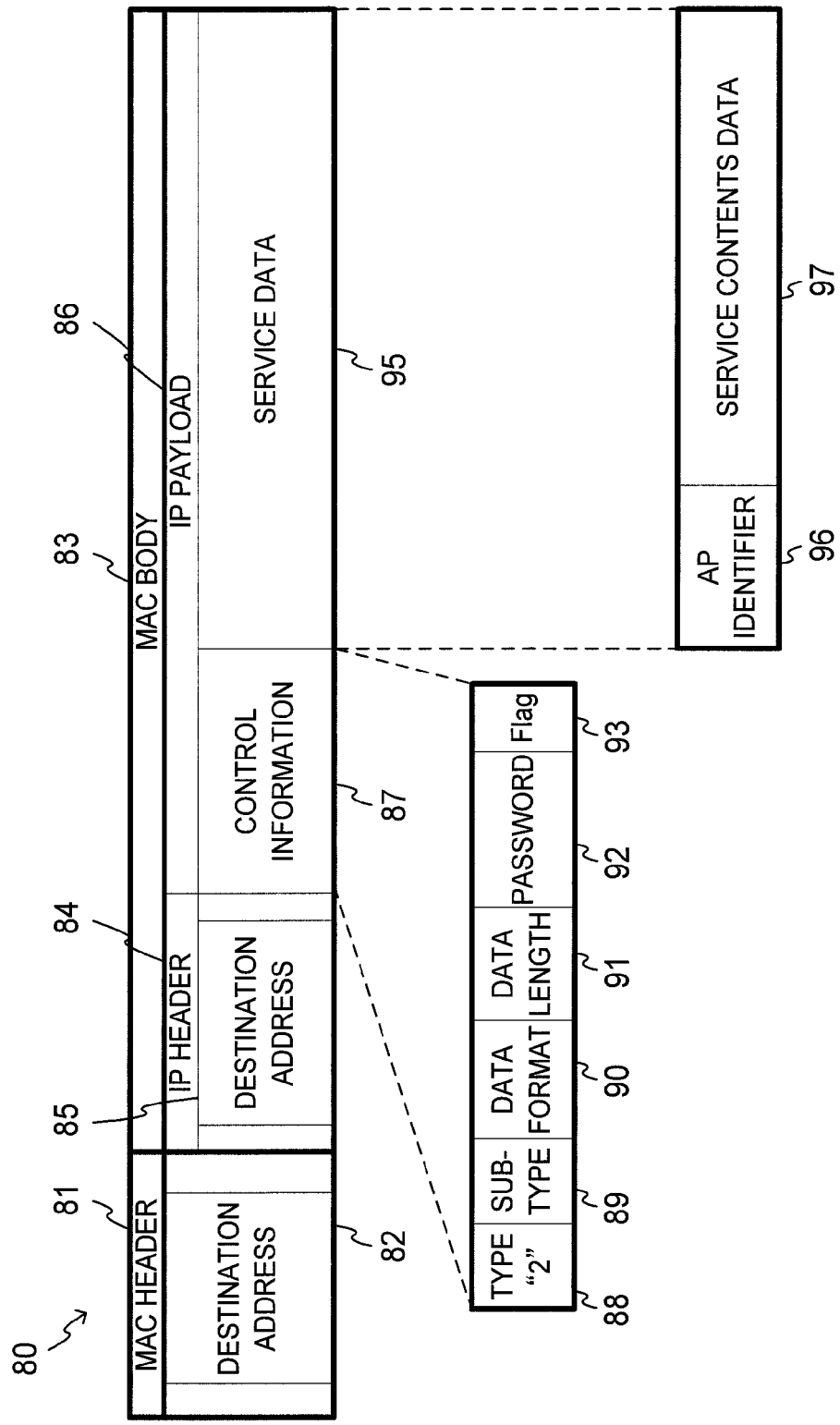
FIG. 7 is an explanatory diagram illustrating the data structure of a communication frame of service data according to the first embodiment of the present invention.

The configuration of a service data communication frame 80, which is transmitted from the service providing server 100, is described next with reference to FIG. 7.

The service data communication frame 80 includes a MAC header 81 and a MAC body 83. The MAC header 81 stores a destination address 82 and other data, and the MAC body 83 stores an IP packet. The IP packet includes a header 84, which stores a destination address 85 and other data, and a payload 86, which stores control information 87 and service data 95. Set as the destination address 82 of the MAC header 81 is the MAC address of the wireless base station 300 to which the service data 95 is to be sent, in other words, the MAC address of the wireless base station 300 to which service information of this service data 95 is to be sent. Set as the destination address 85 of the IP header 84 is, basically, a broadcast address that includes all of the wireless communication terminals 400 as the destinations of the IP packet leaving the wireless base station 300. An exception to this is when one of the wireless communication terminals 400 makes a special request and a response to the request is to be sent as part of a service. Then the IP address of this wireless communication terminal 400 is set as the destination address 85 of the IP header 84.

The control information 87 includes a type 88, a sub-type 89, a data format 90, a data length 91, a password 92, and a flag 93. A value "2" is stored as the type 88 to indicate that data in the payload 86 is service data. Whether a utilization restriction is placed or not is stored as the sub-type 89. The expression format of service contents data is stored as the data format 90. The data length of the service data 95 is stored as the data length 91. A password for disabling the security of the service data 95 is stored as the password 92. A continuance symbol (1) is stored as the flag 93 when service contents data 97 described later is too large in size to be contained within a single packet.

The service data 95 includes an application identifier 96 and the service contents data 97. The application identifier 96 is identical to an application identifier that is stored in the application identifier area 163a of the service information table 160 (FIG. 4). The service contents data 97 is data contained in one of the pieces of service data 147a, 147b, . . . , 147n in the auxiliary storage device 140 that is for the service in question.

The above-mentioned service data communication frame 80 is created by the communication control module 121 as in the case for the service information communication frame 60. However, every piece of data in the IP payload 86 in the service data communication frame 80 is given to the communication control module 121 from one of the service processing modules 126a, 126b, . . . , 126n that executes processing of the service in question. This service processing module may obtain the control information 87 and the application identifier 96 in the communication frame 80 from the service information table 160, or may obtain from service data by including data of the control information 87 and of the application identifier 96 in the service data along with service contents data when storing service data in the auxiliary storage device 140.

Given below with reference to flow charts of FIGS. 9 to 15 is a description on the operation of each wireless communication terminal 400.

Figure 9:
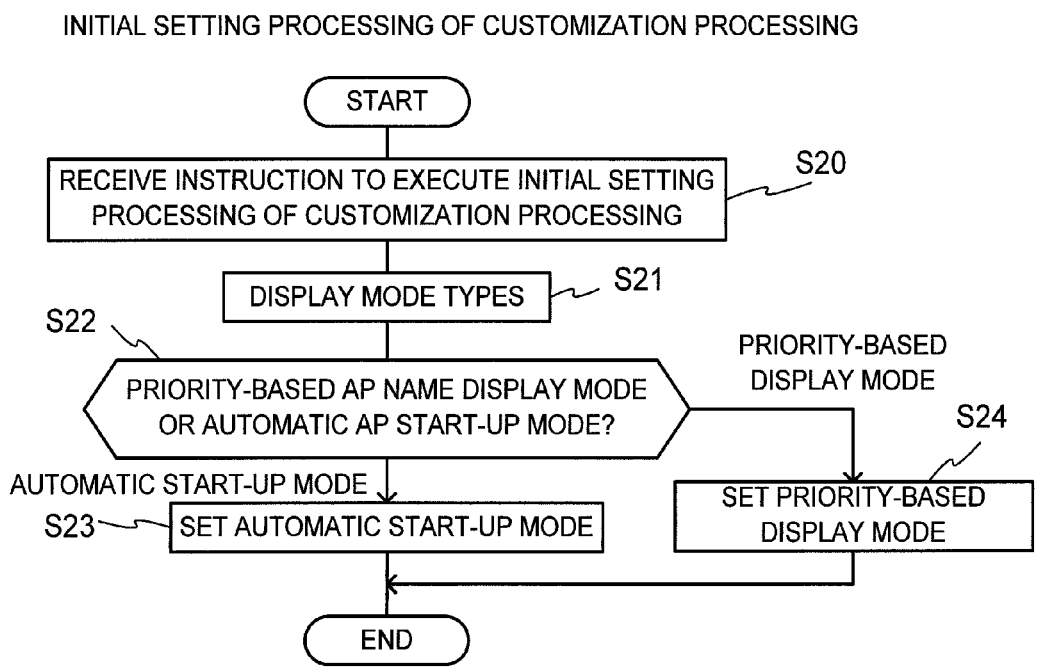
FIG. 9 is a flow chart illustrating initial setting processing of customization processing that is executed in the wireless communication terminal according to the first embodiment of the present invention.

Initial setting processing executed by the customization processing module 429 is described first by following the flowchart of FIG. 9.

The customization processing module 429 receives an instruction to perform initial setting processing from the input keys 453 (S20), and causes the display control module 423 to display all modes of customization processing on the display 454 (S21). Two modes are displayed in this step: one is an automatic start-up mode in which application software identified by application identification information associated with a priority level "A" included in received service information that is automatically started up, and the other is a priority-based display mode in which pieces of application identification information that are contained in received service information are displayed in the order of application utilization priority.

The customization processing module 429 receives an instruction through the input keys 453 about which mode is to be set (S22), and sets the received mode in the customization mode storing area 445 within the flash ROM 440. As illustrated in FIG. 5, "0" is set in the customization mode storing area 445 when the priority-based display mode is to be set, and "1" is set in the customization mode storing area 445 when the automatic start-up mode is to be set.

This completes the initial setting processing.

Figure 10:
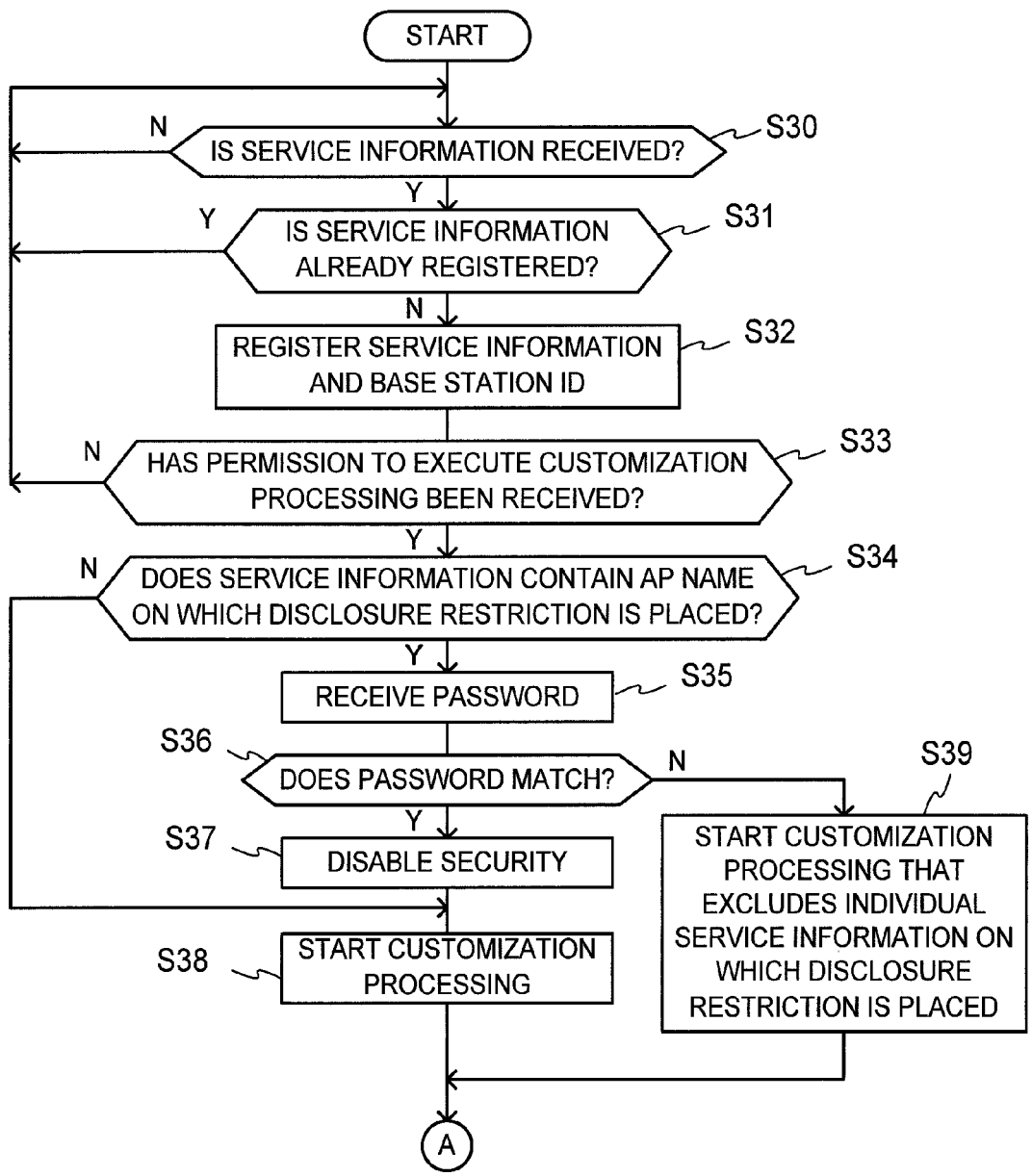
FIG. 10 is a flow chart illustrating transition processing (part 1) for shifting to the customization processing that is executed in the wireless communication terminal according to the first embodiment of the present invention.
Figure 11:
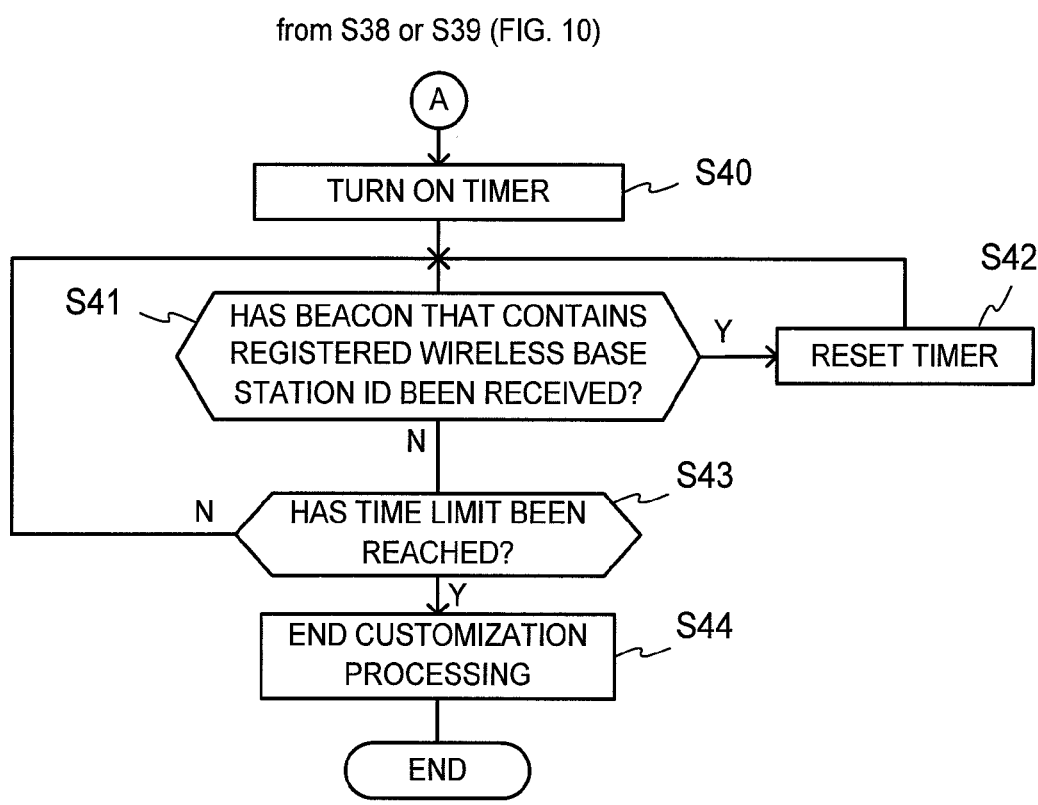
FIG. 11 is a flow chart illustrating the transition processing (part 2) for shifting to the customization processing that is executed in the wireless communication terminal according to the first embodiment of the present invention.

Transition processing for shifting to customization processing that is executed by the customization processing module 429 is described next by following the flow charts of FIGS. 10 and 11.

The second communication control module 421b receives a communication frame, breaks up the communication frame, and hands over data in the communication frame to the customization processing module 429. The customization processing module 429 analyzes the data in the communication frame to determine whether or not service information has been received (S30).

In the case where service information has been received, the customization processing module 429 determines whether or not the service information table 431 has already been created in the RAM 430 and the service information in the communication frame has been registered in the service information table 431 (S31). In the case where the service information in the communication frame has already been registered, the customization processing module 429 returns to Step S30. In the case where the service information in the communication frame has not been registered yet, the customization processing module 429 creates the service information table 431 in the RAM 430, registers the service information in the created service information table 431, and registers a base station ID that is contained in the communication frame in the RAM 430 in association with the created service information table 431 (S32).

The service information table 431 is now described.

As illustrated in FIG. 5, the service information table 431 includes: a space identification information area 431b for storing the service providing space name 71 (FIG. 6) and its associated space identifier 72 which are constituents of individual service information contained in service information; an application identification information area 431c for storing the application name 73 and the application identifier 74 in the individual service information; a priority area 431a for storing the priority 75 in the individual service information; an IP address area 431d for storing the IP address 76 in the individual service information; a restriction flag area 431e for storing the value ("0" (meaning "not restricted") or "1" (meaning "restricted")) of the restriction flag area 77 in the individual service information; a password area 431f for storing the password 78 in the individual service information; and a display completion flag area 431g for indicating whether or not the individual service information has been displayed. A value "1" is stored in the display completion flag area 431g when the individual service information has been displayed. At this stage, "0" indicating that the individual service information has not been displayed is stored in the display completion flag area 431g. The service information table 431 of FIG. 5 is a table for service information received by the wireless communication terminal 400 that is owned by a person in the first train car.

Next, the customization processing module 429 causes the display control module 423 to display a message asking whether to execute customization processing on the display 454. The customization processing module 429 returns to Step S30 when a permission to execute customization processing is not received through the input keys 453, and proceeds to Step S34 when a permission to execute customization processing is received through the input keys 453.

Receiving a permission to execute customization processing in Step S33, the customization processing module 429 determines whether or not the service information registered in Step S32 contains application identification information on which a disclosure restriction is placed (S34). When the service information does not contain application identification information on which a disclosure restriction is placed, the customization processing module 429 proceeds to Step S38. When the service information contains application identification information on which a disclosure restriction is placed, the customization processing module 429 causes the display control module 423 to display a message informing the presence of restricted individual service information and a message requesting to enter a password for the individual service information on the display 454. When a password is entered (S35), the customization processing module 429 determines whether or not the entered password matches a password in the service information (S36).

In the case where the password matches, the customization processing module 429 disables the security of the individual service information whose disclosure has been restricted with a password, and starts customization processing that uses every piece of individual service information in the registered service information (S38). In the case where it is determined in Step S36 that the entered password does not match the password in the service information, on the other hand, the customization processing module 429 causes the display control module 423 to display on the display 454 a message informing that the restricted individual service information cannot be used because the entered password is not a match and, unless the valid password is entered anew, starts customization processing that uses every piece of individual service information in the registered service information except the restricted individual service information (S39). Specifics of customization processing are described later in detail.

Starting the customization processing (S38 or S39), the customization processing module 429 begins countdown on a customization time limit timer (S40 (FIG. 11)), and monitors whether or not the second communication control module 421b has received a beacon that contains the wireless base station ID registered in Step S32 (S41).

When the second communication control module 421b receives a beacon that contains the registered wireless base station ID, the customization processing module 429 resets the customization time limit timer (S42) and then returns to Step S41. In the case where the second communication control module 421b has not received a beacon that contains the registered wireless base station ID, the customization processing module 429 determines whether or not the customization time limit timer has reached the time limit (S43). The customization processing module 429 returns to Step S41 when the timer has not reached the time limit. When the time limit is reached, the customization processing module 429 deletes the service information table 431 that has been created in the RAM 430 in Step S32 and the base station ID that is associated with this service information table 431, and ends the customization processing (S44).

Figure 16:
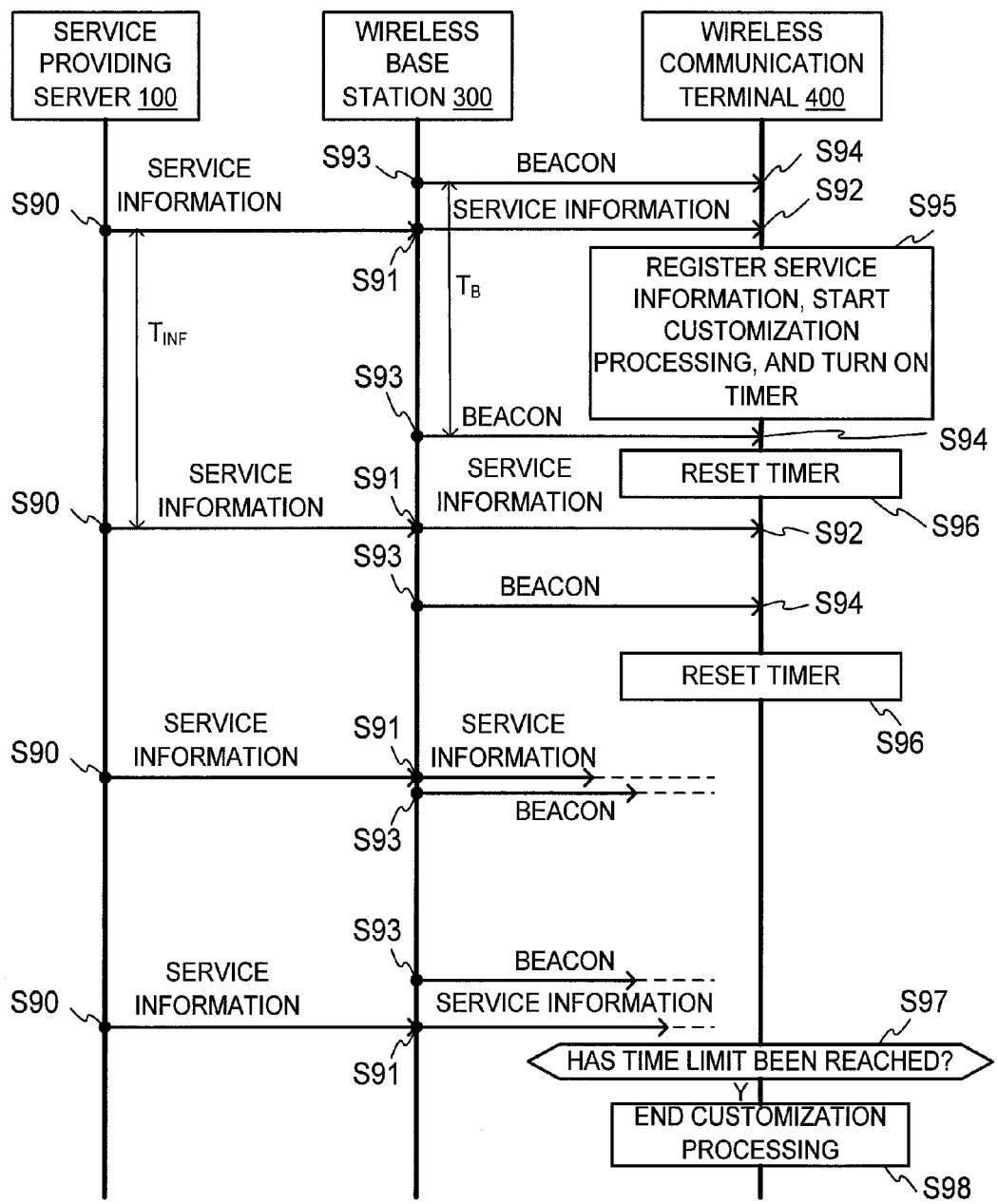
FIG. 16 is a sequence diagram illustrating transition processing for shifting to customization processing that is executed in the service providing system according to the first embodiment of the present invention.

Described next with reference to FIG. 16 are when to transmit service information from the service providing server 100, when to transmit service information and a beacon from the wireless base stations 300, and when to start and end customization processing in the wireless communication terminals 400.

The service providing server 100 sends service information periodically to a specific wireless base station 300 as described above (S90). Receiving the service information, the wireless base station 300 broadcasts the service information by radio (S91). The wireless base station 300 also periodically broadcasts a beacon by radio (S93).

A beacon transmission cycle $T_B$ of the wireless base station 300 is, in the case of a wireless LAN, 100 ms. A service information transmission cycle $T_{INF}$ in this embodiment is 1 second to a few seconds, 0.5 second at minimum. Accordingly, each wireless communication terminal 400 that exists within the reach of wireless signal transmitted from the wireless base station 300 receives a beacon several times to several tens times during a time period in which service information is received once.

The wireless communication terminal 400 receives the service information transmitted by radio from the wireless base station 300 (S92), registers the service information, then starts customization processing, and simultaneously starts countdown on the customization time limit timer (S95 (S32, S38, and S40 in FIGS. 10 and 11)).

The wireless communication terminal 400 subsequently receives a beacon (S94) and resets the customization time limit timer (S96 (S42 in FIG. 11)). The wireless communication terminal 400 may receive the service information again (S94) but does not execute Step S95 because this service information has already been registered.

When, for example, the wireless communication terminal 400 moves out of the area where wireless signal transmitted from the wireless base station 300 reaches, the wireless communication terminal 400 can no longer receive service information and beacons from the wireless base station 300. As a result, the customization time limit timer keeps counting down until the time limit is reached (S97), and the wireless communication terminal 400 ends the customization processing at that point (S98 (S44 in FIG. 11)).

Figure 12:
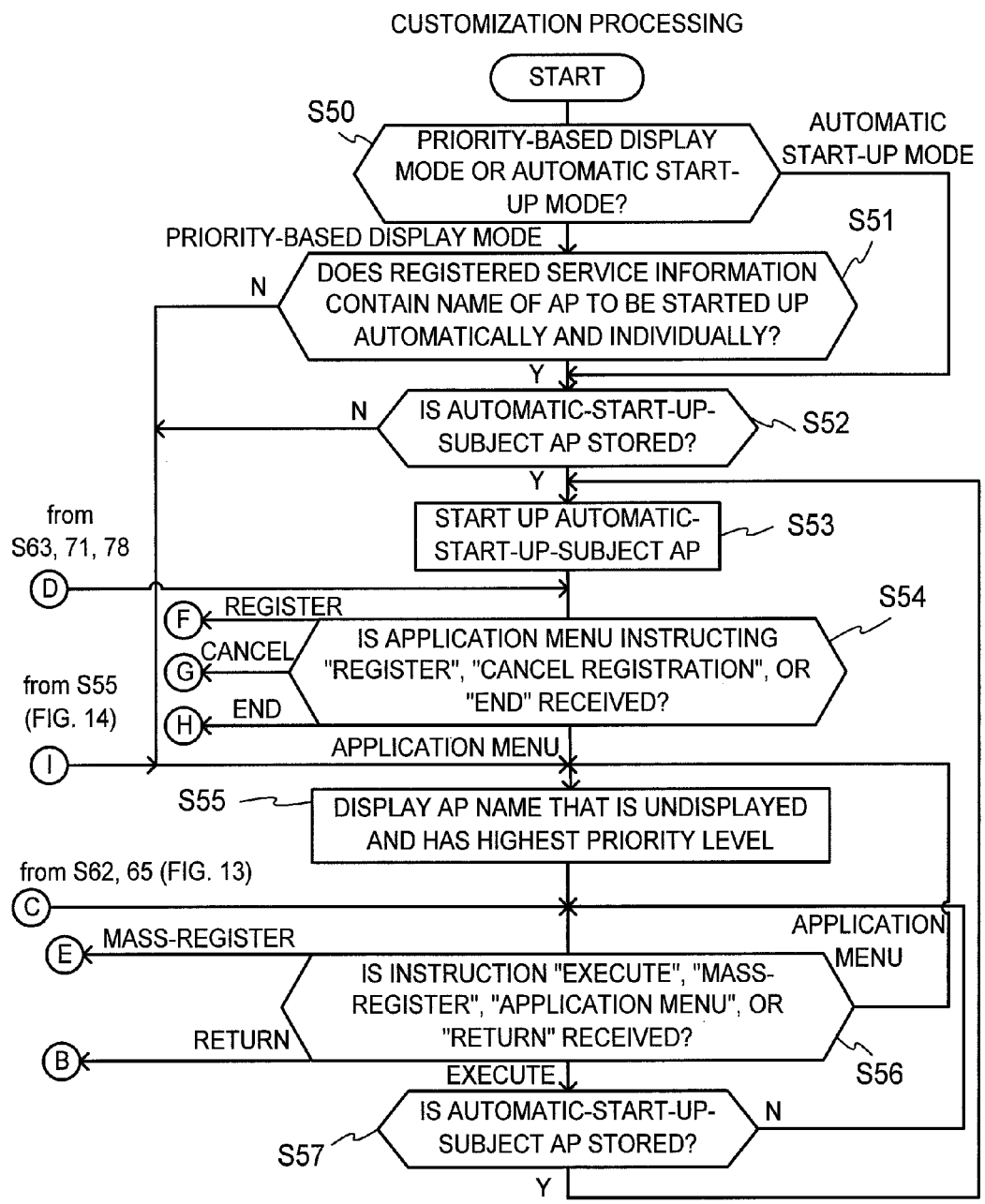
FIG. 12 is a flow chart illustrating the customization processing (part 1) that is executed in the wireless communication terminal according to the first embodiment of the present invention.
Figure 13:
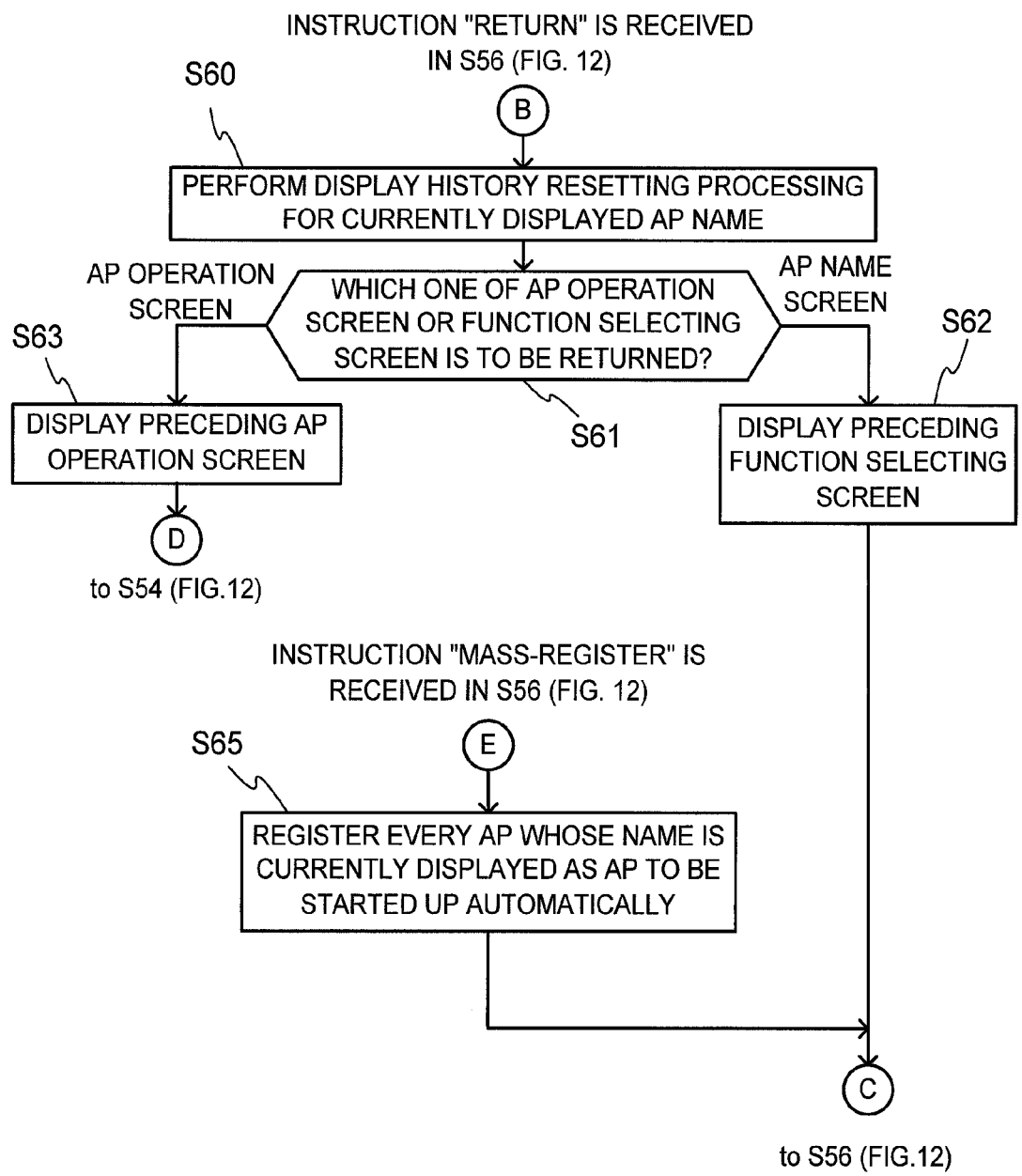
FIG. 13 is a flow chart illustrating the customization processing (part 2) that is executed in the wireless communication terminal according to the first embodiment of the present invention.
Figure 14:
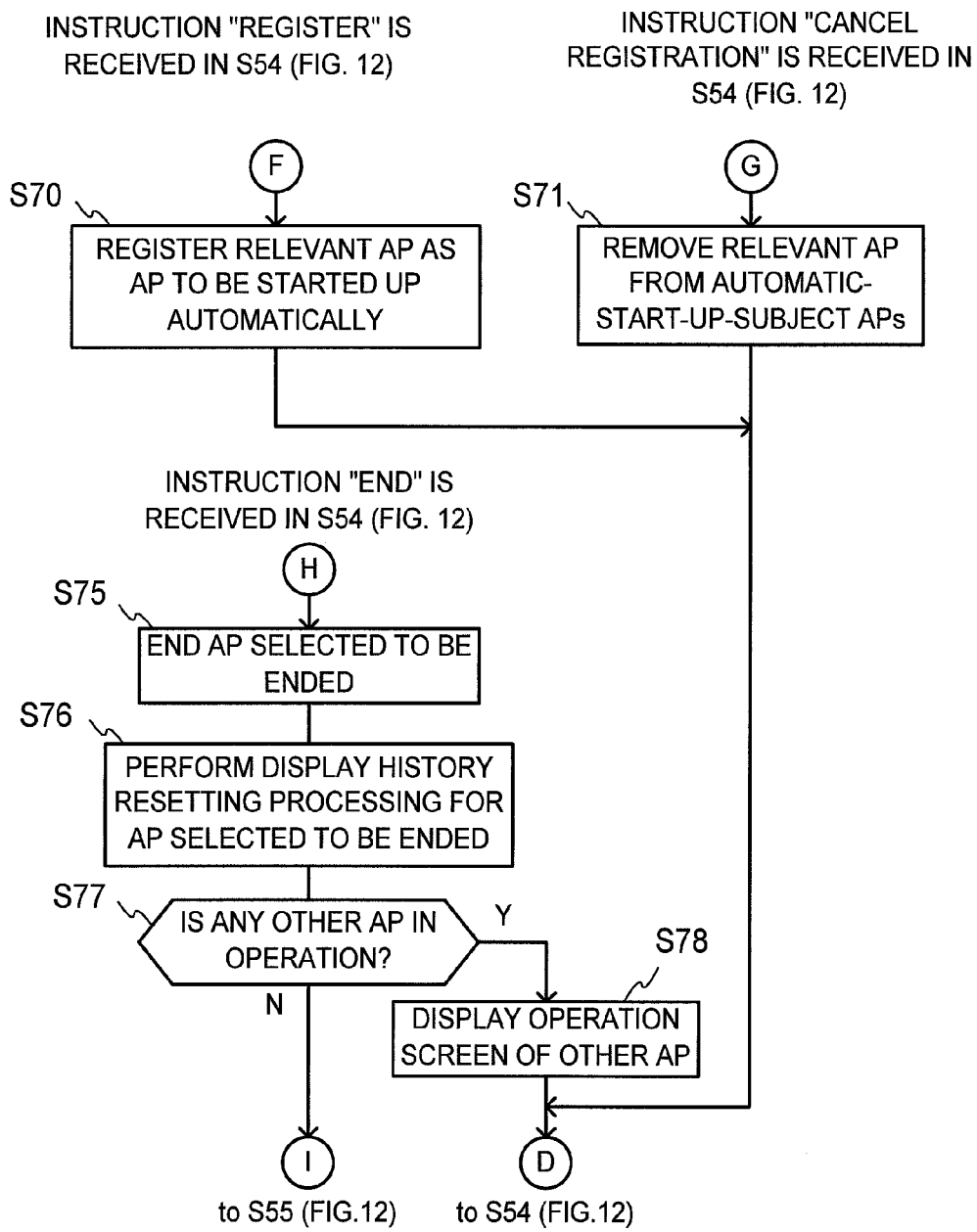
FIG. 14 is a flow chart illustrating the customization processing (part 3) that is executed in the wireless communication terminal according to the first embodiment of the present invention.

Customization processing that is executed by the customization processing module 429 is described next by following the flow charts of FIGS. 12 to 14.

The customization processing module 429 first refers to the customization mode storing area 445 provided in the flash ROM 440 to determine whether the priority-based display mode or the automatic start-up mode is set (S50). When it is the priority-base display mode that is set, the customization processing module 429 determines whether or not the service information registered in the RAM 430 in Step S32 contains application identification information that matches application identification information found on the applications-to-be-automatically-started-up list 446 in the flash ROM 440 (S51).

Determining that no application identification information in the registered service information matches application identification information on the applications-to-be-automatically-started-up list 446, i.e., that no application is to be started up automatically, the customization processing module 429 proceeds to Step S55. In the case where the customization processing module 429 determines that application identification information in the registered service information matches application identification information on the applications-to-be-automatically-started-up list 446 and the mode identified in Step S50 is the automatic start-up mode, in short, when it is determined that there is an application to be started up automatically, the customization processing module 429 determines whether or not the application to be started up automatically is stored in the flash ROM 440 (S52). In the case where there are a plurality of applications to be started up automatically, the customization processing module 429 determines in Step S52 whether or not at least one of those applications is stored in the flash ROM 440.

Determining that none of the applications to be started up automatically is stored in the flash ROM 440, the customization processing module 429 proceeds to Step S55. Determining that at least one of those applications is stored in the flash ROM 440, the customization processing module 429 starts up every application to be started up automatically that is stored in the flash ROM 440 (S53). The customization processing module 429 then accesses the service information table 431 (FIG. 5) to store "1 (meaning "already displayed")" in a section of the display completion flag area 431g that is allocated to the application that has just been started up, and creates a services-to-be-used list in the RAM 430 to put the identifier of this application on the list. In the case where the service information contains an IP address associated with the started up application, the customization processing module 429 also sets the IP address to the started up application.

The service providing server 100 provides, as described above, three types of service: services premised on two-way communication between the service provider and the wireless communication terminals 400, services that are basically push services but sometimes require two-way communication with the service provider, and push services provided in one-way manner from the service provider to the wireless communication terminals 400. Individual service information of services of the first two types where two-way communication with the service provider is sometimes required contains the IP address of the service providing server 100 that is the service provider, as described with reference to FIG. 4. Accordingly, in Step S53, an IP address contained in the service information is set to the started up application when the started up application is for one of the first two types of service where two-way communication with the service provider is sometimes required.

Figure 17:
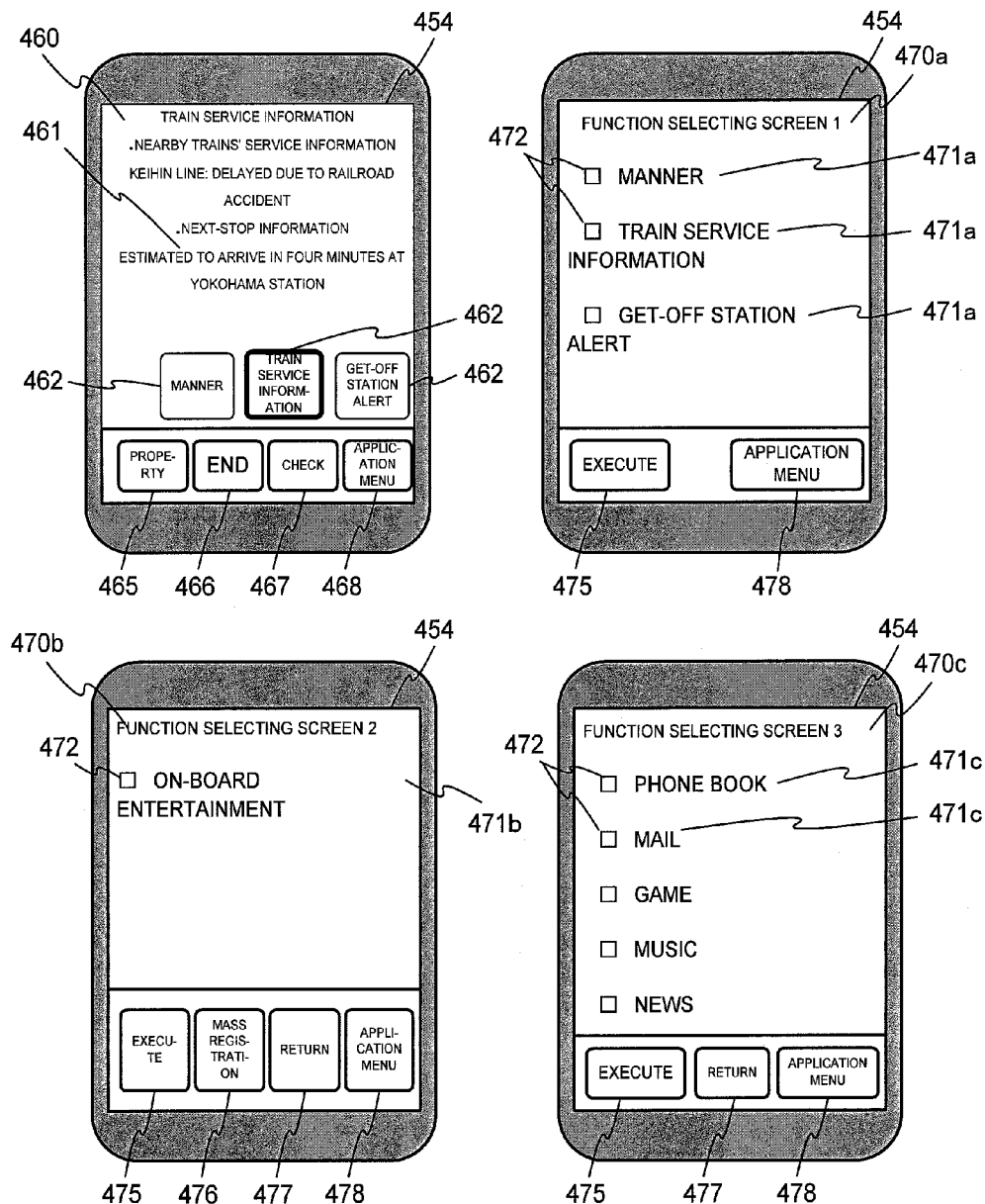
FIG. 17 is an explanatory diagram illustrating display screen examples of the wireless communication terminal according to the first embodiment of the present invention.

At the time the application to be started up automatically is started up, an operation screen of this application is displayed and a service data waiting screen or the like is displayed on the display 454. After service data is received, service contents data contained in the service data, for example, "Train service information", is displayed on the display 454 as illustrated in FIG. 17.

An operation screen 460 of an application "Train service information" which displays contents data of the service "Train service information" includes, in addition to contents data 461 of the service "Train service information", an active application button 462 for indicating which application is in operation, and a plurality of operating buttons 465 to 468. The operating buttons 465 to 468 in the application operation screen are constituted of a property button 465, an end button 466, a check button 467, and an application menu button 468.

The property button 465 is used to register an application that is directed to an automatic-start-up or, when the application is already registered to be started up automatically, to cancel the automatic-start-up registration. The end button 466 is used to end an application that is in operation. The check button 467 is used to check the specifics of the set mode, and to check which application is to be started up automatically and individually. The application menu button 468 is used to display the names of other applications.

When the application menu button 468 is pressed in the application operation screen 460 (when an instruction "application menu" is received in S54), when the set mode is the priority-based display mode, and no application is to be started up automatically and individually ("priority-based display mode" in S50 and "No" in S51), or when the set mode is the automatic start-up mode, and no application is to be started up automatically ("No" in S52), the customization processing module 429 refers to the display completion flag area 431g and the priority area 431a in the service information table 431 (FIG. 5) to cause the display 454 to display a function selecting screen that shows the name of an application whose priority level is the highest of applications and that has not been displayed yet. At the same time, the customization processing module 429 stores "1 (meaning "already displayed")" in a section of the display completion flag area 431g in the service information table 431 (FIG. 5) that is allocated to the application whose name is displayed in the function selecting screen (S55).

In the case where the set mode is the priority-based display mode and no application is to be started up automatically and individually ("priority-based display mode" in S50 and "No" in S51), "0 (meaning "not displayed yet")" is stored in every section of the display completion flag area 431g in the service information table 431 (FIG. 5). Then the customization processing module 429 extracts from the application identification information area 431c every application name that is not restricted and that has a priority level "A", specifically, the application names "manner mode", "Train service information", and "get-off station alert", and causes display 454 to display a function selecting screen 470a, which shows those application names "manner mode", "Train service information", and "get-off station alert" 471a as illustrated in FIG. 17. Displayed in the function selecting screen 470a in addition to the application names 471a are a check box 472, which is placed in front of each of the application names 471a, an "execute" button 475, and an application menu button 478.

The check box 472 is used to select one of the plurality of application names. The execute button 475 is used to execute an application whose name is selected.

In the case where the application menu button 468 is pressed while the application operation screen 460 of FIG. 17 is being displayed (when "application menu" is received in S54), as "1 (meaning "already displayed")" is stored in sections of the display completion flag area 431g in the service information table 431 (FIG. 5) that are allocated to the application names "manner mode", "Train service information", and "get-off station alert", the customization processing module 429 extracts from the application identification information area 431c the name of an application that is not restricted and that has the currently highest priority level "B", specifically, the application name "on-board entertainment", and causes the display 454 to display a function selecting screen 470b, which shows the application name "on-board entertainment" 471b as illustrated in FIG. 17. In the function selecting screen 470b, a mass registration button 476 and a return button 477 are displayed in addition to the application name 471b, the check box 472, the execute button 475, and the application menu button 478.

The mass registration button 476 is used to register all applications whose names are shown in the function selecting screen 470b as applications to be started up automatically and individually. The return button 477 is used to return the display screen to the preceding screen. The mass registration button 476 is not displayed in the function selecting screen 470*a*, which shows the names of applications that have a priority level "A", because every application whose name is shown in the function selecting screen 470*a* has already been registered as applications to be started up automatically. The return button 477 is not displayed in the function selecting screen 470*a* because the function selecting screen 470*a* is the first display screen since the customization processing is started and there is not preceding screen.

In the case where an application menu is received in Step S56, i.e., when the application menu button 478 is pressed in the function selecting screen that is being displayed in Step S56, the customization processing module 429 returns to Step S55 to cause the display 454 to display a new function selecting screen.

For example, in the case where application menu button 478 is pressed while the function selecting screen 470*a* which shows the names of applications that have a priority level "A" is being displayed, the function selecting screen 470*b* which shows the names of applications that have a priority level "B" is displayed on the display 454.

At the stage where the function selecting screen 470*b* which shows the names of applications that have a priority level "B" is displayed, "1 (meaning "already displayed")" is stored in every section of the display completion flag area 431*g* in the service information table 431 that is allocated to the name of an unrestricted application (FIG. 5). In short, every application name that is stored in the service information table 431 has already been displayed. Accordingly, when the application menu button 478 is pressed while the function selecting screen 470*b* is being displayed, the customization processing module 429 causes the display 454 to display a function selecting screen 470*c*, which shows application names 471*c* of applications that are not stored in the service information table 431 and that are stored in the flash ROM 430.

In the case where an instruction "execute" is received in Step S56, i.e., when the execute button 475 is pressed after the check box 472 in front of one of the application names is checked in the function selecting screen that is being displayed in Step S56, the customization processing module 429 determines whether or not the application instructed to be executed is stored in the flash ROM 430 (S57). In the case where the application is not stored, the display 454 keeps displaying the current function selecting screen and the customization processing module 429 returns to Step S56. In the case where the application is stored in the flash ROM 430, the customization processing module 429 returns to Step S53 to start up this application.

In the case where an instruction "return" is received in Step S56, i.e., when the return button 477 is pressed in the function selecting screen that is being displayed in Step S56, the customization processing module 429 performs display history resetting processing for every application name shown in the currently displayed function selecting screen (S60 (FIG. 13)). The display history resetting processing is to change "1 (meaning "already displayed")" in the display completion flag area 431*g* of the service information table 431 back to "0 (meaning "not displayed yet")". The display history resetting processing is executed because a user may wish to see the current function selecting screen again after the display screen returns to the preceding screen.

After performing the display history resetting processing (S60), the customization processing module 429 determines which screen the display screen is returned to, an application operation screen or a function selecting screen. When the display screen is returned to an application operation screen, the customization processing module 429 causes the display 454 to display the application operation screen (S63) and then moves back to Step S54 (FIG. 12). When the display screen is returned to a function selecting screen, the customization processing module 429 causes the display to 454 display the function selecting screen (S62) and then moves back to Step S56 (FIG. 12).

In the case where an instruction to mass-register is received in Step S56, i.e., when the mass registration button 476 is pressed in the function selecting screen that is being displayed in Step S56, the customization processing module 429 registers every application whose name is shown in the current function selecting screen as an application to be started up automatically and individually, and puts identification information of each registered application on the applications-to-be-automatically-started-up list 446 (FIG. 5). The customization processing module 429 then instructs the display 454 to maintain the current function selecting screen and returns to Step S56 (FIG. 12).

In the case where an instruction to register is received in Step S54, i.e., when the registration button is pressed in the application operation screen, the customization processing module 429 registers every application that is in operation as an application to be started up automatically, and puts identification information of each registered application on the applications-to-be-automatically-started-up list 446 (FIG. 5) (S70 (FIG. 14)). The customization processing module 429 then instructs the display 454 to maintain the current application operation screen and returns to Step S54 (FIG. 12).

In the case where an instruction to cancel registration is received in Step S54, i.e., when a "cancel registration" button is pressed in the application operation screen, identification information of the application whose registration is instructed to be cancelled is removed from the applications-to-be-automatically-started-up list 446 (FIG. 5) (S71 (FIG. 14)). The customization processing module 429 then instructs the display 454 to maintain the application operation screen and returns to Step S54 (FIG. 12).

The register button and the cancel registration button are displayed by pressing the property button 465 in the application operation screen. The register button is displayed when the application that is in operation has not been directed to an automatic-start-up. The cancel registration button is displayed when the application that is in operation has already been directed to an automatic-start-up.

In the case where an instruction to end is received in Step S54, i.e., when the end button 466 is pressed in the application operation screen, the customization processing module 429 ends the application that is in operation (S75 (FIG. 14)), and performs the display history resetting processing for this application as described above (S76). The customization processing module 429 then determines whether or not there is another application that is in operation and, when no other application is in operation, returns to Step S55 (FIG. 12) to cause a function selecting screen to be displayed. When there is another application that is in operation, the customization processing module 429 causes an application operation screen of the other application to be displayed on the display 454 (S78) and then returns to Step S54 (FIG. 12).

The customization processing is thus executed.

In the case where the customization processing is ended (S44 (FIG. 11)) while an application operation screen of one application is being displayed (S53 and S54 (FIG. 12)), any one of the buttons in the application operation screen, specifically, the register button, the cancel registration button, the end button, and the application button, can be pressed and functions. However, when it is the application menu button that is pressed, since registered service information has been deleted from the RAM 430, application names contained in the registered service information are not displayed. Instead, the same function selecting screen that is displayed with the press of the application menu button while the customization processing is not being executed, specifically, the function selecting screen 470c of FIG. 17, is displayed. In the case where the customization processing is ended while an application is in operation, the wireless communication terminal 400 can no longer receive service information from the wireless base station 300 that has transmitted service information. Therefore, although the application itself is operating, service data is not updated so that the user is forced to end the application by pressing the end button.

In the case where the customization processing is ended (S44 (FIG. 11)) while a function selecting screen is being displayed (S55 and S56 (FIG. 12)), the display 454 of the wireless communication terminal 400 displays an initial menu screen.

Figure 15:
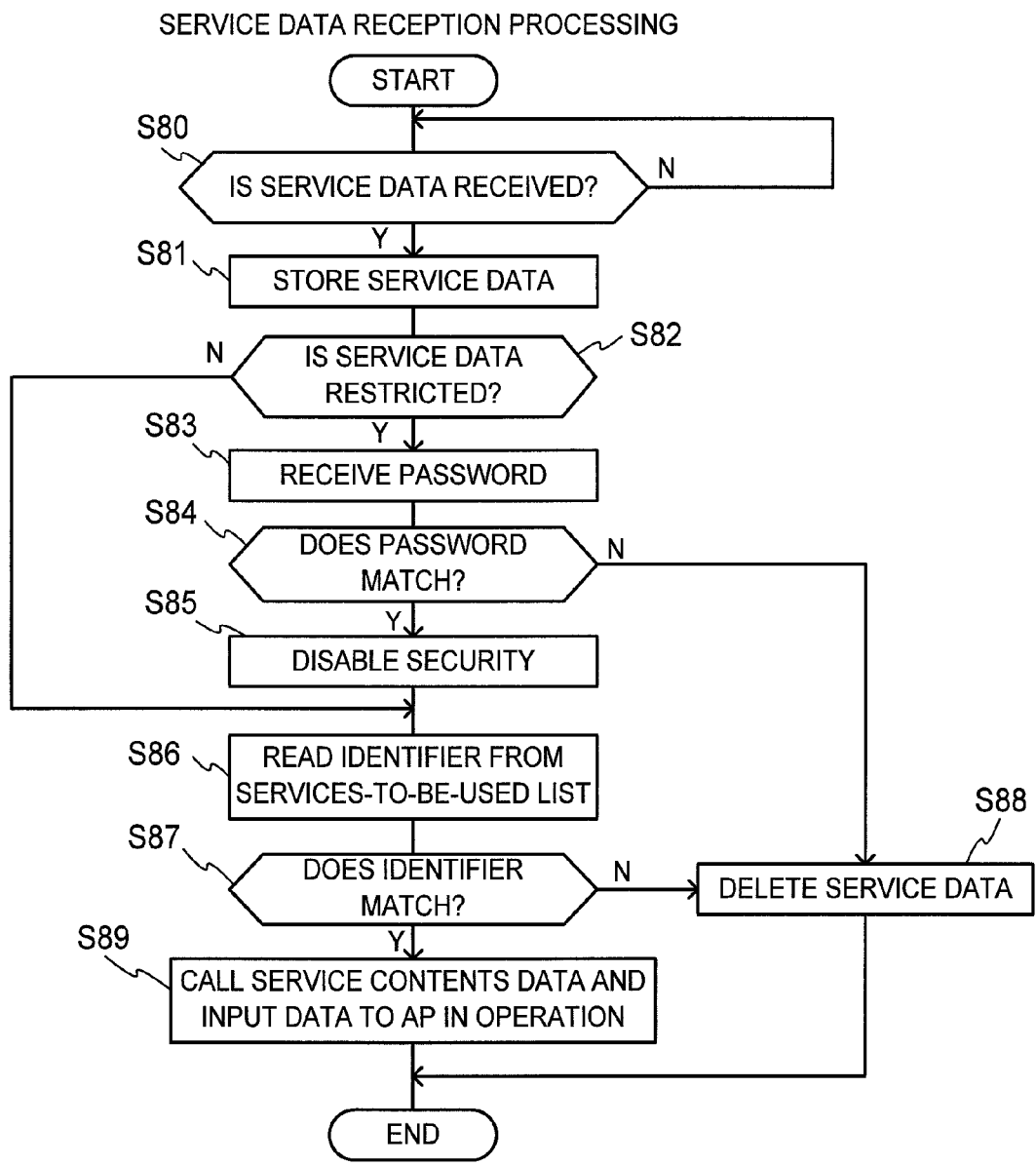
FIG. 15 is a flow chart illustrating service data reception processing of the wireless communication terminal according to the first embodiment of the present invention.

Service data reception processing executed by the customization processing module 429 is described next by following the flow chart of FIG. 15.

As described above, the second communication control module 421b receives a communication frame and breaks up the communication frame to hand over data in the communication frame to the customization processing module 429. The customization processing module 429 analyzes the data in the communication frame to determine whether or not service data has been received (S80). Determining that the data in the communication frame is service data, the customization processing module 429 stores the control information 87 and the service data 95 (FIG. 7) that are contained in the communication frame's IP payload in the RAM 430 (S81).

The customization processing module 429 next reads the sub-type 89 (FIG. 7) from the control information 87 stored in the RAM 430, and refers to the sub-type 89 to determine whether or not a data utilization restriction is placed (S82). The customization processing module 429 proceeds to Step S86 when there is no utilization restriction and, when there is a utilization restriction, causes the display control module 423 to display a password entering screen on the display 454 to receive a password (S83). Receiving a password, the customization processing module 429 reads the password 92 (FIG. 7) from the control information 87 stored in the RAM 430 to determine whether or not the password 92 and the received password match (S84). When the passwords do not match, the customization processing module 429 deletes the service data from the RAM 430 and ends the service data reception processing. When the passwords match, the customization processing module 429 performs processing of disabling the security of the service data 95 (FIG. 7) stored in the RAM 430 by using the password (S85), and then proceeds to Step S86.

In Step S86, the customization processing module 429 reads an application identifier from the services-to-be-used list that is created in Step S53 (FIG. 12) in the RAM 430. The customization processing module 429 determines whether or not the application identifier 96 in the service data 95 and the application identifier on the services-to-be-used list match (S87).

Determining in Step S87 that the identifiers do not match, the customization processing module 429 proceeds to Step S88 to delete the service data from the RAM 430, and ends the service data reception processing. Determining that the identifiers match, the customization processing module 429 calls the service contents data 97 (FIG. 7) in the service data 95, and inputs the service contents data 97 to application software that is active (S89). In short, the customization processing module 429 starts service contents data processing with the use of the active application.

This completes the service data reception processing.

In the description given above, an application identifier is stored in a services-to-be-used list created in the RAM 430 in Step S53 (FIG. 12) based on service information, and whether or not this application identifier matches the application identifier 96 in the service data 95 is determined in Step S87. Alternatively, an application identifier and a space identifier may be stored in a services-to-be-used list created in the RAM 430 in Step S53 (FIG. 12) based on service information, so that whether or not the application identifier and the space identifier respectively match an application identifier and a space identifier in service data is determined in Step S87 (FIG. 15). In this case, the service data 95 of FIG. 7 includes a space identifier in addition to the application identifier 96 and the service contents data 97. By thus managing application identifiers and space identifiers in pairs, receiving an unwanted service can be avoided. For example, considering a case in which an electric appliance section and a toy section are on the same floor of a department store, the two sections each have a wireless base station from which section-specific information services are transmitted by radio, and the wireless communication terminals 400 are located at the border between the two sections. Then, the same application software can be used to receive a section-specific information service for the electric appliance section and a section-specific information service for the toy section and, accordingly, if application identification information is managed alone, there is a chance that the section-specific information service for the other section (e.g., the toy section) is received instead of the section-specific information service for the objective section (e.g., the electric appliance section). By managing application identifiers and space identifiers in pairs in the manner described above, receiving an unwanted service can be avoided.

Figure 18:
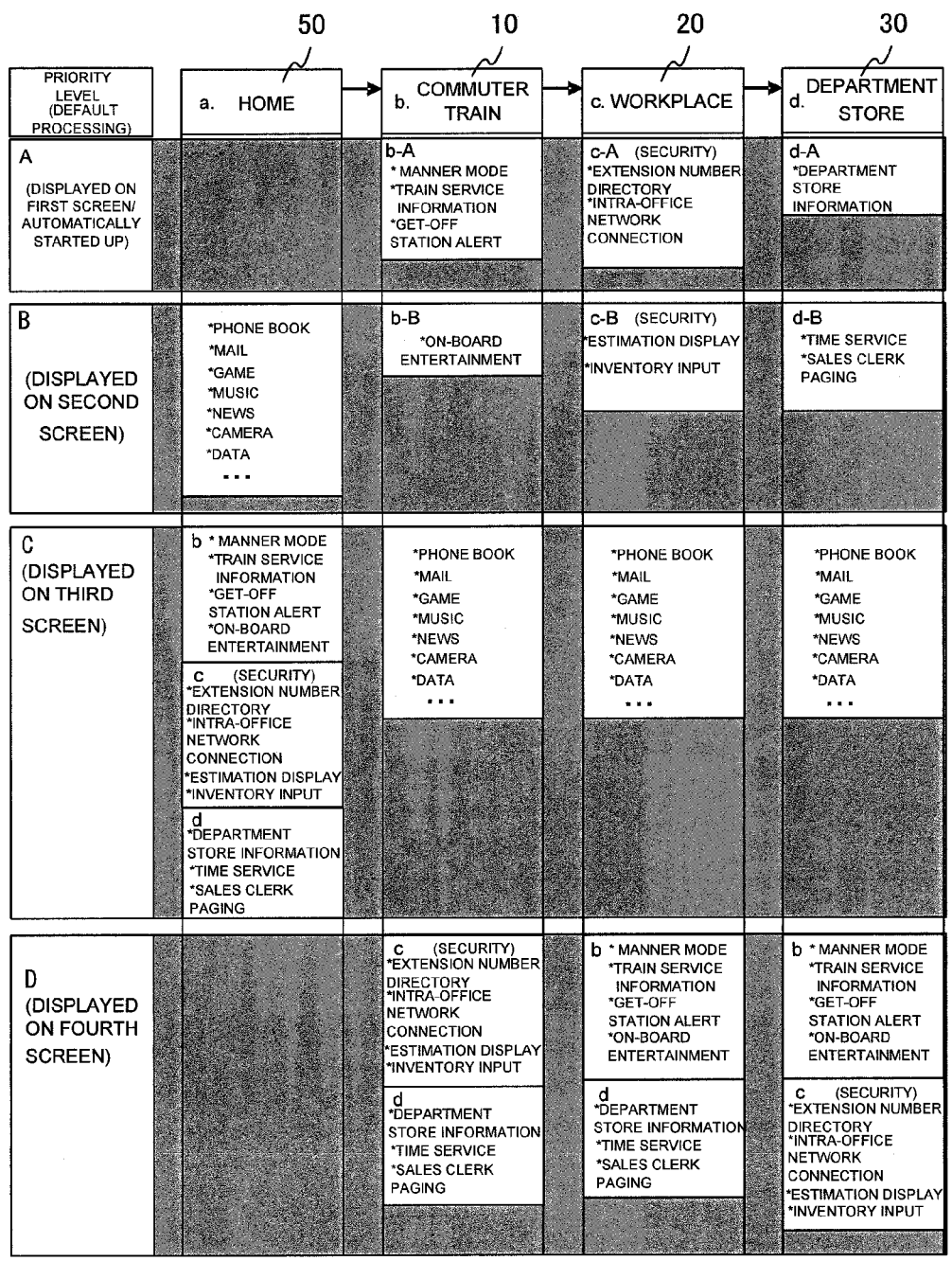
FIG. 18 is an explanatory diagram illustrating changes in the order of displaying application names on the wireless communication terminal according to the first embodiment of the present invention.

Given below with reference to FIG. 18 is a description on what is displayed on one wireless communication terminal 400 when the owner of the wireless communication terminal 400 moves from one wireless service providing space to another.

The description deals with a case in which the owner of the wireless communication terminal 400 leaves the home 50 in FIG. 1, gets on the train 10, arrives at the workplace 20, and then goes to the department store 30. The home 50 is not located in a wireless service providing space. Wireless services provided on the train 10 include the manner mode service (priority level: A), the Train service information service (priority level: A), the get-off station alert service (priority level: A), and the on-board entertainment service (priority level: B) as in the description given above. Wireless services provided at the workplace 20 include an extension number directory service (priority level: A), an intra-office network connection service (priority level: A), an estimation display service (priority level: B), and an inventory input service (priority level: B), on each of which a disclosure restriction is placed. Wireless services provided at the department store 30 include a department store information service (priority level: A), a limited-time discount service (priority level: B), and a sales clerk paging service (priority level: B).

When the wireless communication terminal 400 is in the home 50, the customization processing is not executed because the wireless communication terminal 400 is not in a wireless service providing space. Accordingly, when a function selecting screen is called up in the home 50, the function selecting screen 470c of FIG. 17 is displayed which shows such application names as "phone book", "mail", and "game".

When the wireless communication terminal 400 is on the train 10 and receives service information from one of the wireless base stations 300 in the train 10, the names of applications that have the priority level A in the received service information, specifically, the "manner mode" application, the "Train service information" application, and the "get-off station alert" application, are displayed first, or those applications are started up. If the application menu button is pressed subsequently, the name of the "on-board entertainment" application which has the priority level B is displayed next.

While being in the workplace 20, the wireless communication terminal 400 receives service information from one of the wireless base stations 300 that are installed in the workplace 20. When the wireless communication terminal 400 receives a valid password, the wireless communication terminal displays first the names of applications that have the priority level A in the received service information, specifically, an "extension number directory" application and an "intra-office network connection" application, or starts up those applications. If the application menu button is pressed subsequently, the names of applications that have the priority level B, specifically, an "estimation display" application and an "inventory input" application, are displayed next.

When the wireless communication terminal 400 is in the department store 30 and receives service information from one of the wireless base stations 300 that are installed in the department store 30, the name of an application that has the priority level A in the received service information, specifically, a "department store information" application, is displayed or started first. If the application menu button is pressed subsequently, the names of applications that have the priority level B, specifically, a "time-limited discount" application and a "sales clerk paging" application, are displayed next.

As it is apparent from the foregoing, changing a location among respective wireless service providing spaces means a change in what is displayed on the function selecting screen in this embodiment. In other words, the customization of what is displayed on the wireless communication terminal 400 is executed in this embodiment.

As has been described, according to this embodiment, the following effects (1) and (2) are obtained:

(1) Each wireless base station 300 providing a wireless service provides service information as well in this embodiment. The identification information of every application that allows users to receive a wireless service at the current location is therefore displayed without advance knowledge of the SSID of the wireless base station 300 at the current location and what wireless service is provided at the current location, and without the need to set in advance a table showing the relation between an ID that identifies a location or the like and application software to be automatically started up in connection with the identified location or the like. Moreover, application identification information in this embodiment is displayed in the order of application utilization priority. A wireless service available at the current location can thus be received efficiently.

(2) In this embodiment, in a case where application software for a specific wireless service is loaded on one wireless communication terminal 400, the application software is started up automatically if a high priority level and the automatic start-up mode are set to the application software, or if the application software is set in advance to be started up automatically. Users are therefore saved from the trouble of starting up the application software manually. Moreover, when two-way communication between the server 100 that is the provider of this service and the wireless communication terminal 400 is necessary to provide the specific wireless service, the IP address of the service provider in the service identification information is automatically set to the started up application software in this embodiment. Users are therefore saved from the trouble of setting the service provider's IP address manually.

Second Embodiment

This embodiment deals with a modification of the transition processing for shifting to the customization processing in the first embodiment. The rest of the basic configuration of this embodiment is the same as that of the first embodiment.

Figure 19:
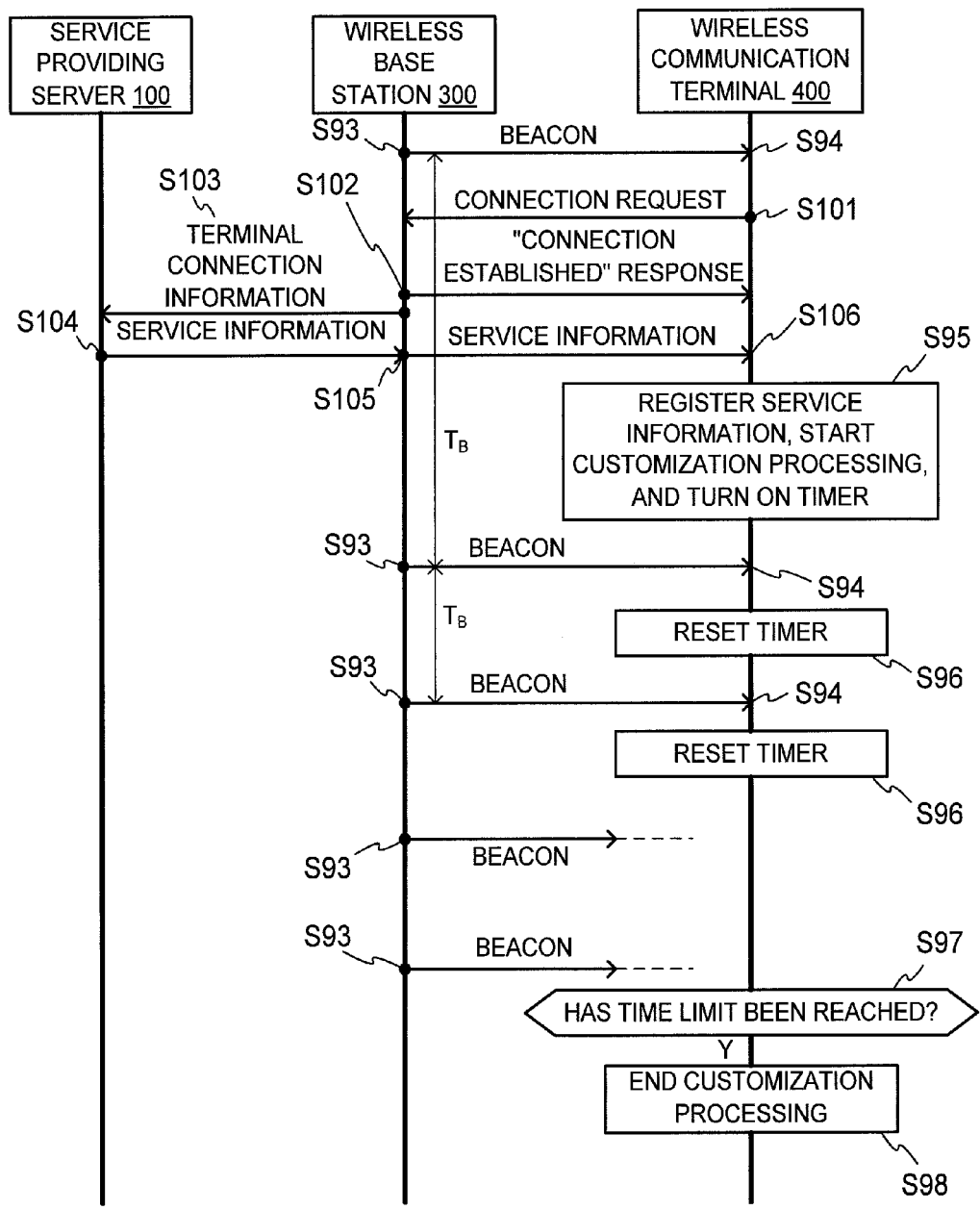
FIG. 19 is a sequence diagram illustrating transition processing for shifting to customization processing that is executed in a service providing system according to a second embodiment of the present invention.

As in the first embodiment, each wireless base station 300 periodically broadcasts a beacon by radio in a manner illustrated in FIG. 19 (S93).

The beacon is received by the second communication control module 421b of each relevant wireless communication terminal 400 (S94), and the second communication control module 421b transmits a connection request to the wireless base station 300 that has sent the beacon (S101).

Receiving the connection request, the wireless base station 300 sends a "connection established" response to the wireless communication terminal 400 that has made the connection request (S102), and sends terminal connection information to the service providing server 100 (S103). The terminal connection information contains a message informing that the wireless base station 300 is currently connected with the wireless communication terminal 400 and, in addition, the IP address of the wireless communication terminal 400, the MAC address of the wireless base station 300, and the like.

The terminal connection information is received by the communication control module 121 of the service providing server 100 and handed over to the service information extracting module 129. The service information extracting module 129 refers to the MAC address of the wireless base station 300 which is contained in the terminal connection information, collects from the service information table 160 pieces of individual service information that the wireless base station 300 is to transmit to the wireless communication terminal 400, and creates service information that contains those pieces of individual service information. The service information extracting module 129 then specifies an IP address contained in the terminal connection information as the destination IP address of the created service information, and hands over the created service information to the communication control module 121. The communication control module 121 uses the service information, the IP address, and other information handed over from the service information extracting module 129 to create the communication frame 60 of FIG. 6, and transmits the communication frame 60 to the wireless base station 300 (S104).

Receiving the communication frame 60, the wireless base station 300 transmits by radio the service information to the wireless communication terminal 400 that is identified by the destination IP address contained in the communication frame 60 (S105).

The wireless communication terminal 400 receives the service information transmitted by radio by the wireless base station 300 (S106). Subsequently, similarly as in the processing of FIG. 16, the wireless communication terminal 400 registers the service information, starts customization processing, and simultaneously starts counting down on the customization time limit timer (S95).

The wireless communication terminal 400 thereafter receives a beacon (S94) and resets the customization time limit timer (S96). In the case where the wireless communication terminal 400 is incapable of receiving a beacon from the wireless base station 300 and the customization time limit timer keeps counting down until the time limit is reached (S97), the wireless communication terminal 400 ends the customization processing at that point (S98).

Figure 20:
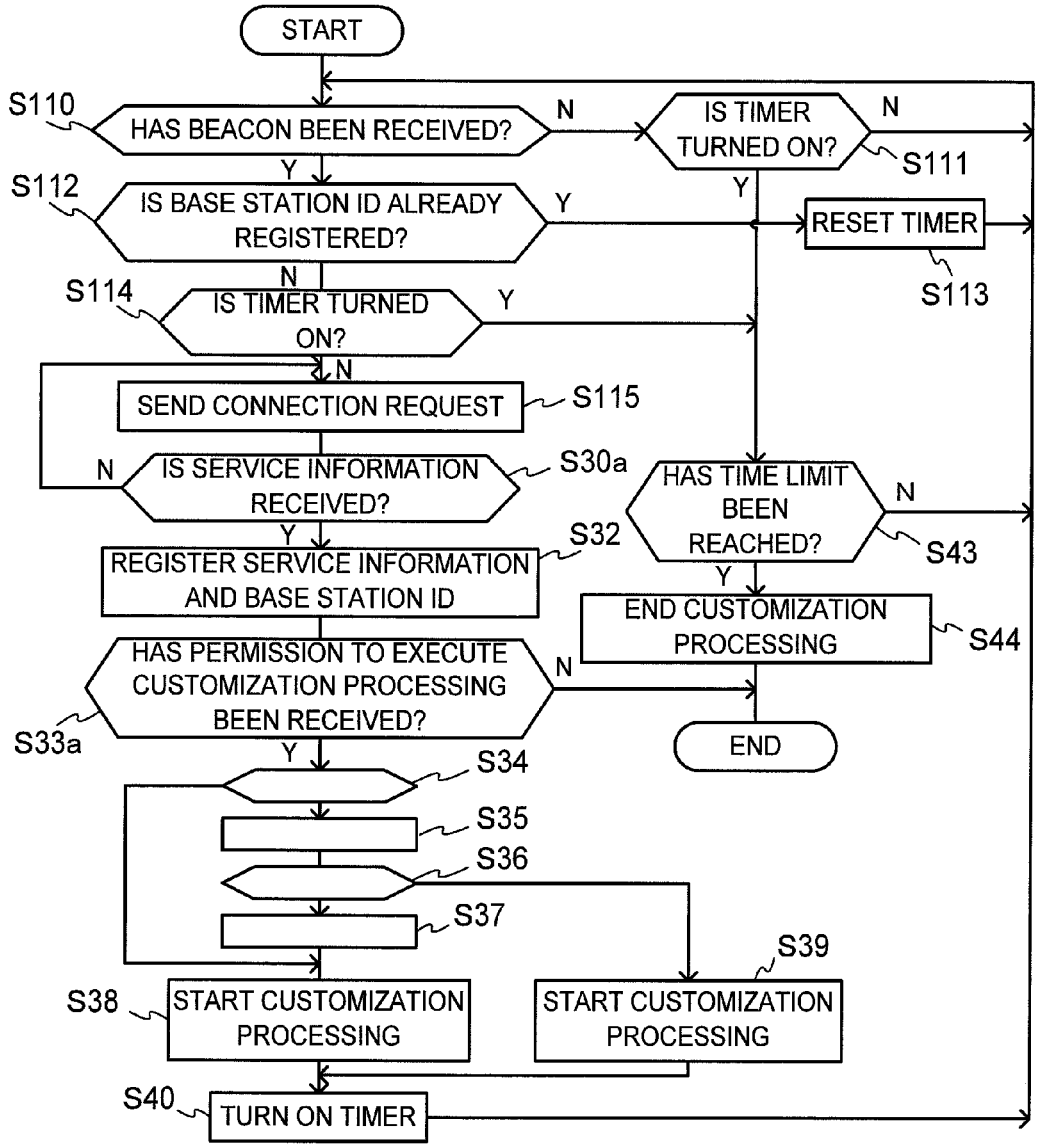
FIG. 20 is a flow chart illustrating transition processing for shifting to customization processing that is executed in a wireless communication terminal according to the second embodiment of the present invention.

A concrete description is given next with reference to FIG. 20 on the transition processing for shifting to the customization processing that is executed in each wireless communication terminal 400 according to this embodiment.

The second communication control module 421*b* of the wireless communication terminal 400 receives a communication frame, breaks up the communication frame, and hands over data in the communication frame to the customization processing module 429. The customization processing module 429 analyzes the data in the communication frame to determine whether or not a beacon has been received (S110).

In the case where a beacon has been received, the customization processing module 429 determines whether or not a base station ID contained in the beacon is already registered in the RAM 430 (S112). In the case where the base station ID has been registered, the customization processing module 429 resets the customization time limit timer which is counting down (S113) and returns to Step S110.

Irrespective of whether a beacon has been received or not, the customization processing module 429 is always checking whether the customization time limit timer is turned on (S111 and S114). Determining that the timer is turned on, the customization processing module 429 determines whether or not the time limit has been reached (S43). In the case where the timer has not reached the time limit, the customization processing module 429 returns to Step S110. When the time limit is reached, the customization processing module 429 ends that customization processing that has been started (S44) and ends the transition processing in a manner described later.

Determining that a beacon has not been reached and that the customization time limit timer is not turned on ("No" in S111), the customization processing module 429 returns to Step S110. In the case where a beacon is received and a base station ID contained in the beacon is unregistered, it is determined that the customization time limit timer is not turned on ("No" in S114), the customization processing module 429 transmits a connection request via the second communication control module 421*b* to the wireless base station 300 that has sent this beacon (S115 (S101 in FIG. 19)). The connection request contains the IP address of the wireless communication terminal 400.

Receiving the connection request, the wireless base station 300 sends terminal connection information to the service providing server 100 in the manner described above (S103 (FIG. 19)). The service providing server 100 creates service information based on the terminal connection information, and sends the created service information to the wireless communication terminal 400 via the wireless base station 300 (S104 and S105 (FIG. 19)).

After transmitting the connection request (S115), the wireless communication terminal 400 enters into a service information waiting state and, when a given period of time passes without receiving service information(S30*a*), the customization processing module 429 returns to Step S115 to make a connection request again.

When service information is received, the customization processing module 429 registers the service information and a base station ID in the RAM 430 as in the first embodiment (S32). The customization processing module 429 next causes the display 454 to display a message asking whether to execute customization processing, as in the first embodiment. The customization processing module 429 ends the transition processing in the case where a permission to execute customization processing is not received through the input keys 453 and, in the case where a permission to execute customization processing is received through the input keys 453, proceeds to Step S34.

The customization processing module 429 executes Step S34 and its subsequent Steps S35 to S40 in the same way as in the first embodiment.

The customization processing module 429 starts customization processing in Step S38 or S39 and immediately starts counting down on the customization time limit timer (S40), before returning to Step S110.

In the case where a beacon is no longer received from the wireless base station 300 that is identified by the registered base station ID and the customization time limit timer reaches the time limit (S43), the customization processing module 429 ends the customization processing (S44) and ends the transition processing as described above.

As has been described, in this embodiment, where each wireless base station 300 sends service information to the wireless communication terminals 400 only when the wireless communication terminals 400 are connected to the wireless base station 300, the utilization efficiency of wireless bands is raised when the number of users within the service area of the wireless base station 300 is small.

Third Embodiment

This embodiment is similar to the second embodiment in that this embodiment deals with a modification of the transition processing for shifting to the customization processing in the first embodiment. A service providing system of this embodiment is, as illustrated in FIG. 21, obtained by adding to the service providing system of the first embodiment an address providing server 600, which provides the IP address of each service providing server 100.

Figure 21:
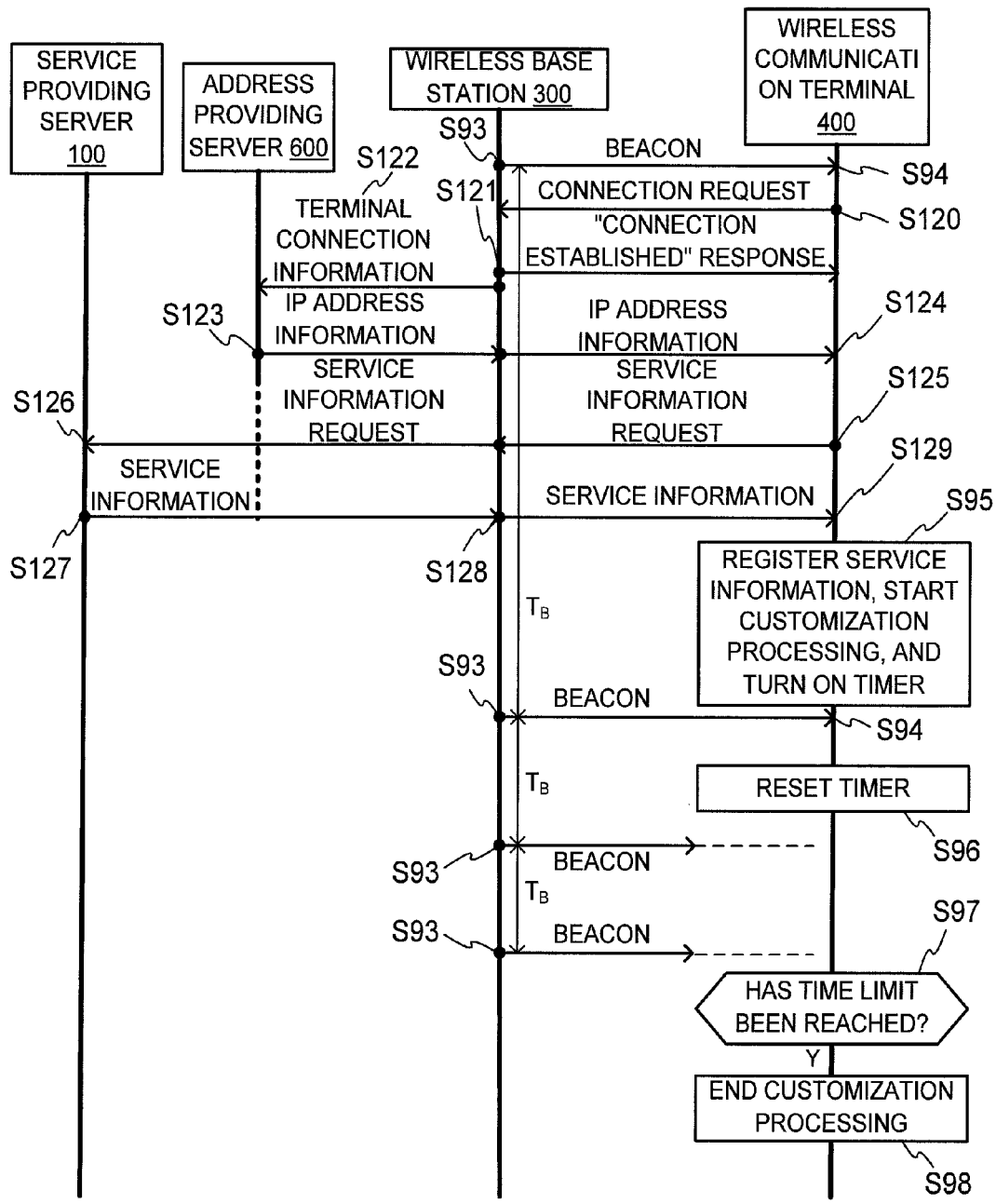
FIG. 21 is a sequence diagram illustrating transition processing for shifting to customization processing that is executed in a service providing system according to a third embodiment of the present invention.

Also in this embodiment, each wireless base station 300 periodically broadcasts a beacon by radio in a manner illustrated in FIG. 21 (S93).

The beacon is received by the second communication control module 421*b* of each relevant wireless communication terminal 400 (S94), and the second communication control module 421*b* transmits a connection request to the wireless base station 300 that has sent the beacon (S120).

Receiving the connection request, the wireless base station 300 sends a "connection established" response to the wireless communication terminal 400 that has made the connection request (S121), and sends terminal connection information to the above-mentioned address providing server 600 (S122). The terminal connection information contains a message informing that the wireless base station 300 is currently connected with the wireless communication terminal 400 and, in addition, the IP address of the wireless communication terminal 400, the MAC address of the wireless base station 300, and the like.

Receiving the terminal connection information, the address providing server 600 creates IP address information to which the IP address contained in the terminal connection information is set as the destination IP address and which contains the IP address of the relevant service providing server 100, and sends the IP address information via the wireless base station 300 to the wireless communication terminal 400 that has made the connection request (S123).

The wireless communication terminal 400 receives the IP address information (S124), sets the IP address contained in the IP address information as the destination IP address of a service information request, and sends the service information request to the service providing server 100 via the wireless base station 300 (S125). The service information request contains a message requesting service information and, in addition, the MAC address of the wireless base station 300 to which the wireless communication terminal 400 is currently connected, the IP address of the wireless communication terminal 400, and the like.

When the communication control module 121 of the service providing server 100 receives the request for the service information (S126), the communication control module 121 hands over the request to the service information extracting module 129. The service information extracting module 129, as with the second embodiment, refers to the MAC address of the wireless base station 300 which is contained in the request for the service information, collects from the service information table 160 pieces of individual service information that the wireless base station 300 is to transmit to the wireless communication terminal 400, and creates service information that contains those pieces of individual service information. The service information extracting module 129 then specifies an IP address contained in the request for the service information as the destination IP address of the created service information, and hands over the created service information to the communication control module 121. The communication control module 121 uses the service information, the IP address, and other information handed over from the service information extracting module 129 to create the communication frame 60 of FIG. 6, and transmits the communication frame 60 to the wireless base station 300 (S127).

Receiving the communication frame 60, the wireless base station 300 transmits by radio the service information to the wireless communication terminal 400 that is identified by the destination IP address contained in the communication frame 60 (S128).

The wireless communication terminal 400 receives the service information transmitted by radio by the wireless base station 300 (S129). Subsequently, the wireless communication terminal 400 executes the same processing (S95 to S98) as the processing of FIGS. 16 and 19.

Figure 22:
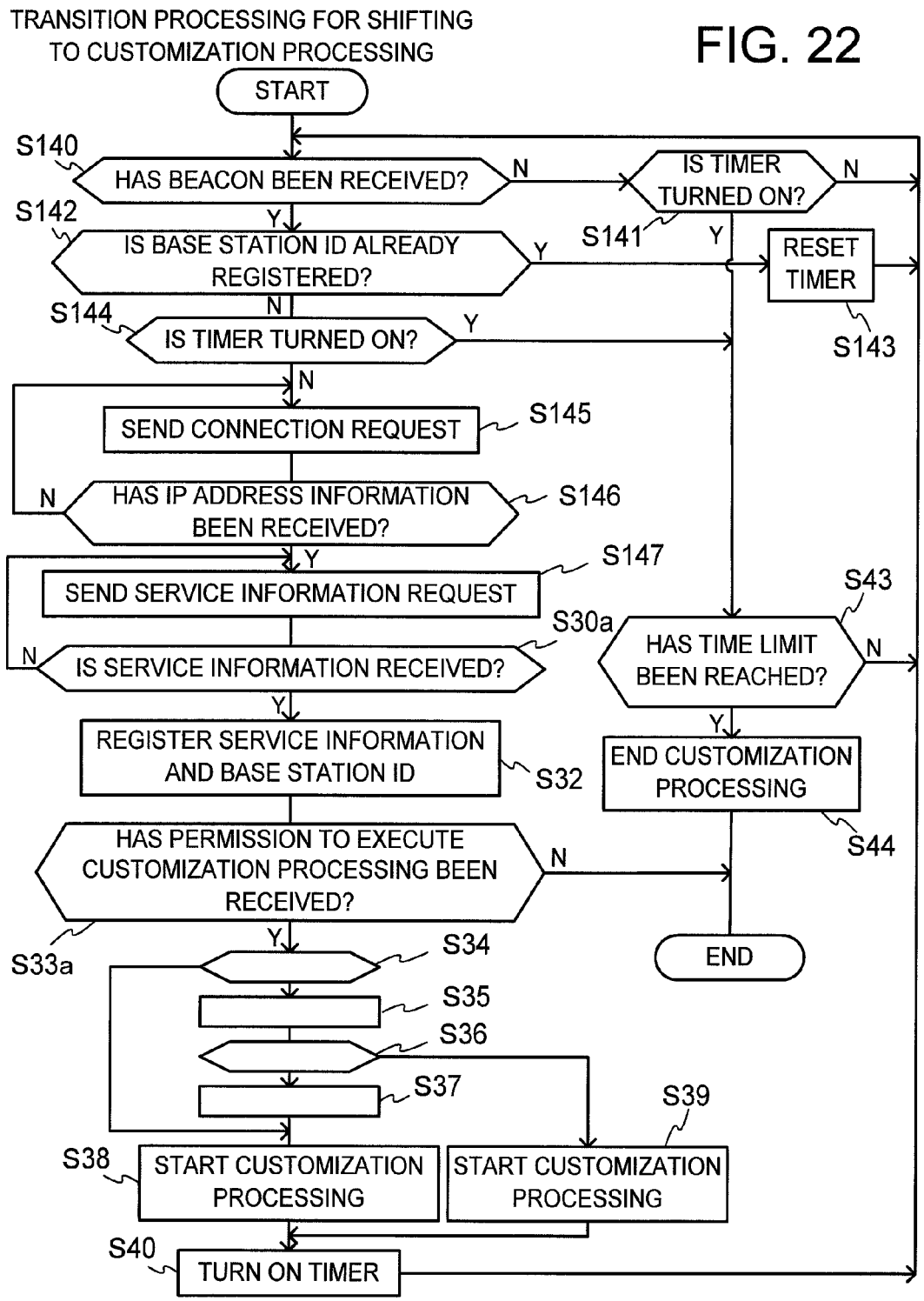
FIG. 22 is a flow chart illustrating transition processing for shifting to customization processing that is executed in a wireless communication terminal according to the third embodiment of the present invention.

A concrete description is given next with reference to FIG. 22 on the transition processing for shifting to the customization processing that is executed in each wireless communication terminal 400 according to this embodiment.

The second communication control module 421*b* of the wireless communication terminal 400 receives a communication frame, breaks up the communication frame similarly as in the second embodiment, and hands over data in the communication frame to the customization processing module 429. The customization processing module 429 analyzes the data in the communication frame to determine whether or not a beacon has been received (S140).

In Step S140 and Steps S141 to S145, the customization processing module 429 executes the same processing that is executed in Step S110 and Steps S111 to S115 of the second embodiment. After transmitting the connection request in Step S145, the wireless communication terminal 400 enters into an IP address information waiting state and, when a given period of time passes without receiving IP address information (S146), the customization processing module 429 returns to Step S145 to make a connection request again.

The wireless base station 300 receives the connection request and sends terminal connection information to the address providing server 600 as described above (S122 (FIG. 21)). Receiving the terminal connection information, the address providing server 600 sends IP address information that contains the IP address of the relevant service providing server 100 via the wireless base station 300 to the wireless communication terminal 400 that has made the connection request (S123 (FIG. 21)).

The customization processing module 429 of the wireless communication terminal 400 receives the IP address information via the second communication control module 421*b*, and creates a service information request. The service information request contains, as described above, a message requesting service information, the MAC address of the wireless base station 300 to which the wireless communication terminal 400 is currently connected, the IP address of the wireless communication terminal 400, and the like. The customization processing module 429 hands over the service information request to the second communication control module 421*b*, specifies the IP address contained in the IP address information as the destination IP address of the service information request, and causes the second communication control module 421*b* to transmit the service information request (S147 (S125 in FIG. 21)).

Receiving the service information request via the wireless bass station 300 (S126 (FIG. 21)), the service providing server 100 creates service information based on the service information request, and sends the created service information to the wireless communication terminal 400 via the wireless base station 300 (S127 and S128 (FIG. 21)).

After transmitting the service information request (S147), the customization processing module 429 of the wireless communication terminal 400 enters into a service information waiting state and, when a given period of time passes without receiving service information (S30*a*), the customization processing module 429 returns to Step S147 to make a service information request again.

When service information is received, the customization processing module 429 registers the service information and a base station ID in the RAM 430 as in the first and second embodiments (S32).

The customization processing module 429 subsequently executes processing in the same way as in the second embodiment.

Specifically, from Step S33*a* to Step S40, the customization processing module 429 executes the same processing as in the first and second embodiments to start customization processing in Step S38 or S39 and immediately starts counting down on the customization time limit timer (S40), before returning to Step S110. In the case where a beacon is no longer received from the wireless base station 300 that is identified by the registered base station ID and the customization time limit timer reaches the time limit (S43), the customization processing module 429 ends the customization processing (S44) and ends the transition processing as described above.

As has been described, also in this embodiment, similarly to the second embodiment, each wireless base station 300 sends service information to the wireless communication terminals 400 only when the wireless communication terminals 400 are connected to the wireless base station 300, and hence the utilization efficiency of wireless bands is raised when the number of users within the service area of the wireless base station 300 is small.

MODIFICATION EXAMPLES

In the first to third embodiments, in the priority-based display mode where the names of applications are displayed in the order of application utilization priority, the names of applications that have the highest utilization priority level are displayed and then, with the press of the application menu button, the names of applications that have the second highest utilization priority level are displayed in a different screen. Subsequently, the names of applications that have the next highest utilization priority level are displayed on a different screen each time the application menu button is pressed. Instead, all application names contained in one piece of service information may be displayed in the same screen in a manner that makes the names of applications having a high utilization priority level more visible and the names of applications having a low utilization priority level less visible, and that requires scrolling down the screen to view application identification information of the applications low in utilization priority.

In the first to third embodiments, the application name is the only element of application identification information that is displayed on the screen as application identification information. Alternatively, an application identifier may be displayed along with the application name as application identification information, or the application identifier alone may be displayed as application identification information.

The wireless communication terminals 400 in the first to third embodiments have a wireless communication function that uses a wireless LAN or the like to receive a wireless service through wireless communication, and a wireless communication function that uses a cellular phone communication network to communicate by radio. However, a wireless communication terminal in the present invention does not need to have both of the wireless communication functions, and only needs to have the wireless communication function for receiving a wireless service.

What is claimed is:

1. An information providing server comprising at least a storage device that stored at least one piece of application software for providing at least one service to a wireless communications terminal and at least one data necessary for the service, a communication interface, and a control module, which provides the at least one service to the wireless communication terminal connected by radio to the at least one wireless base station via the at least one wireless base station, wherein:
    the storage device stores service information including application identification information of at least one piece of application software that is available within a wireless service area of the at least one wireless base station, in association with an identifier of the wireless station for each of the wireless base stations; and
    the control module is configured to:
        extract from the storage device, the service information stored in association with an identifier of each of the wireless base stations;
        create a communication frame that contains the extracted service information; and
        transmit the created communication frame to the wireless communication terminal via the wireless base station that is associated with the service information in the communication frame in a predetermined cycle, and notify the wireless communication terminal of the service information including application identification information of at least one piece of application software that is available within a wireless service area of the wireless base station.

2. An information providing server according to claim 1, wherein the service information stored in the storage device comprises space identification information for uniquely identifying a space wherein a wireless base station having an identifier associated with the service information provides a service.

3. An information providing server according to claim 2, wherein the service information stored in the storage device comprises an utilization priority level of each of the at least one piece of application software that is provided by a wireless base station having an identifier associated with the service information.

4. An information providing server according to claim 3, wherein the storage device stores a distribution cycle in a case where the service information is transmitted to the at least one wireless base station in the predetermined cycle, in association with the identifier of the wireless base station, and
    wherein the control module extracts the service information from the storage device, based on the distribution cycle of the service information for the each of at least one wireless base station, creates a communication frame that contains the extracted service information, and transmits the created communication frame from the communication interface to the at least one wireless base station.

5. An information providing server according to claim 4, wherein when creating the communication frame that contains the service information, the control module adds to the communication frame an instruction to broadcast the contained service information from the each of the at least one wireless base station.

6. An information providing server comprising at least a storage device that stored at least one piece of application software for providing at least one service to a wireless communication terminal and at least one data necessary for the service, a communication interface, and a control module, which provides the at least one service to the wireless communication terminal connected by radio to the at least one wireless base station via the at least one wireless base station, wherein:
    the storage device stores the service information including application identification information of at least one piece of application software that is available within a wireless service area of the at least one wireless base station, in association with an identifier of the wireless base station for each of the wireless base station; and
    the control module is configured to:
        receive terminal connection information that contains an address of the wireless communication terminal and the wireless base station from the base station which received a connection request from the wireless communication terminal, extract from the storage device, the service information that is associated with and identifier of the wireless base station;
        create a communication frame that contains the extracted service information; and
        transmit the created communication frame to the wireless communication terminal via the wireless base station that is associated with the service information in the communication frame, and notify the wireless communication terminal of the service information including application identification information of at least one piece of application software that is available within a wireless service area of the wireless base station.

7. An information providing server according to claim 6, wherein the service information stored in the storage device comprises space identification information for uniquely identifying a wireless service providing space of a wireless service that is provided by a wireless base station having an identifier associated with the service information.

8. An information providing server according to claim 7, wherein the service information stored in the storage device comprises a utilization priority level of each of the at least one piece of application software that is provided through wireless communication by a wireless base station having an identifier associated with the service information.

* * * * *